Nov. 27, 1962 W. A. MOHUN 3,066,099
MINERAL ACTIVE CARBON AND PROCESS FOR PRODUCING SAME
Filed June 29, 1959 5 Sheets-Sheet 1

INVENTOR
WILLIAM A. MOHUN
BY *James M. Grow*
ATTORNEY

Nov. 27, 1962  W. A. MOHUN  3,066,099
MINERAL ACTIVE CARBON AND PROCESS FOR PRODUCING SAME
Filed June 29, 1959  5 Sheets-Sheet 2

Nov. 27, 1962 W. A. MOHUN 3,066,099
MINERAL ACTIVE CARBON AND PROCESS FOR PRODUCING SAME
Filed June 29, 1959 5 Sheets-Sheet 4

Sigma-electrons. •
pi – electrons ○

INVENTOR
WILLIAM A. MOHUN
BY
ATTORNEY

Nov. 27, 1962     W. A. MOHUN     3,066,099
MINERAL ACTIVE CARBON AND PROCESS FOR PRODUCING SAME
Filed June 29, 1959     5 Sheets-Sheet 5

INVENTOR.
WILLIAM A. MOHUN

United States Patent Office 3,066,099
Patented Nov. 27, 1962

3,066,099
MINERAL ACTIVE CARBON AND PROCESS FOR PRODUCING SAME
William A. Mohun, Lewiston, N.Y., assignor to Nilok Chemicals, Inc., Niagara Falls, N.Y., a corporation of New York
Filed June 29, 1959, Ser. No. 823,384
38 Claims. (Cl. 252—445)

This invention relates to a novel method of preparing highly adsorbent and catalytically active carbons from novel raw materials, and has the further novel feature that metal or metalloid chlorides, as for example zirconium tetrachloride or silicon tetrachloride, are produced as a co-product.

In the following disclosure, the term "active carbon" is used in preference to the term "activated carbon" because it avoids the inference that an activation process has necessarily been used in its preparation. The term "carbon" as used in the art includes large classes of materials which are not substantially pure carbon, as will be discussed below. The term "active carbon" means any form of carbon that possesses substantial adsorptive power.

Figure 1:
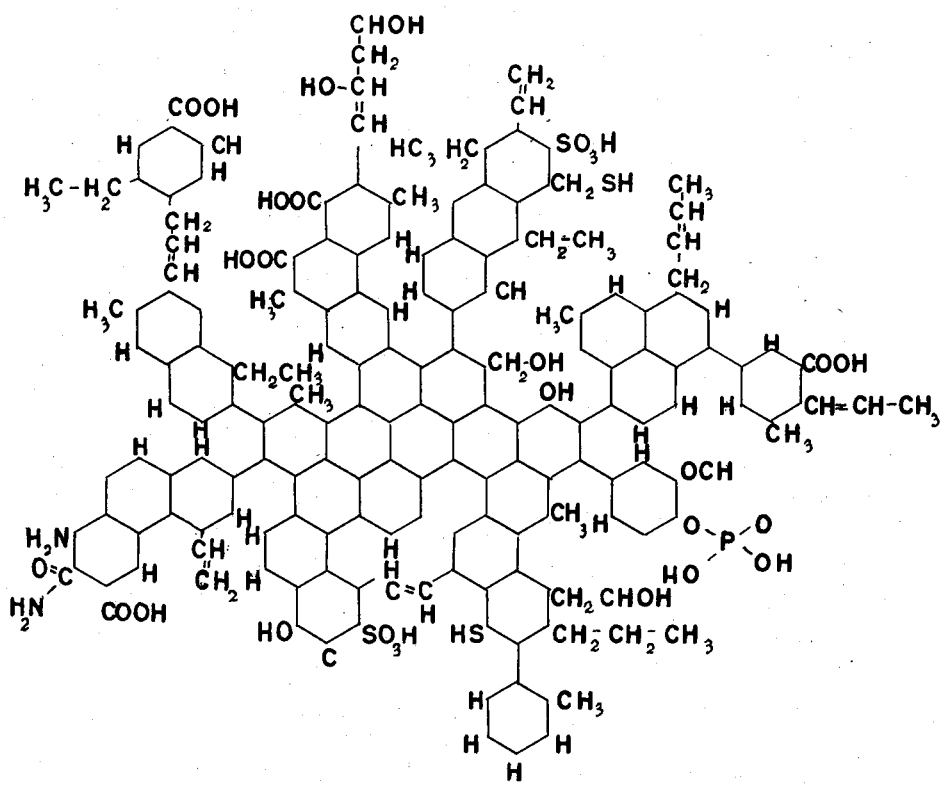
Figure 2:
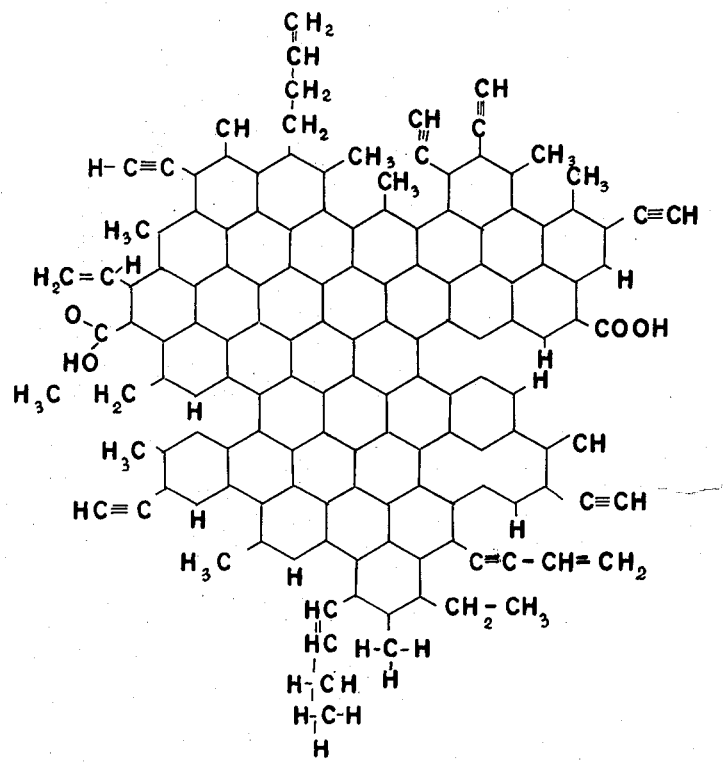
Figure 3:
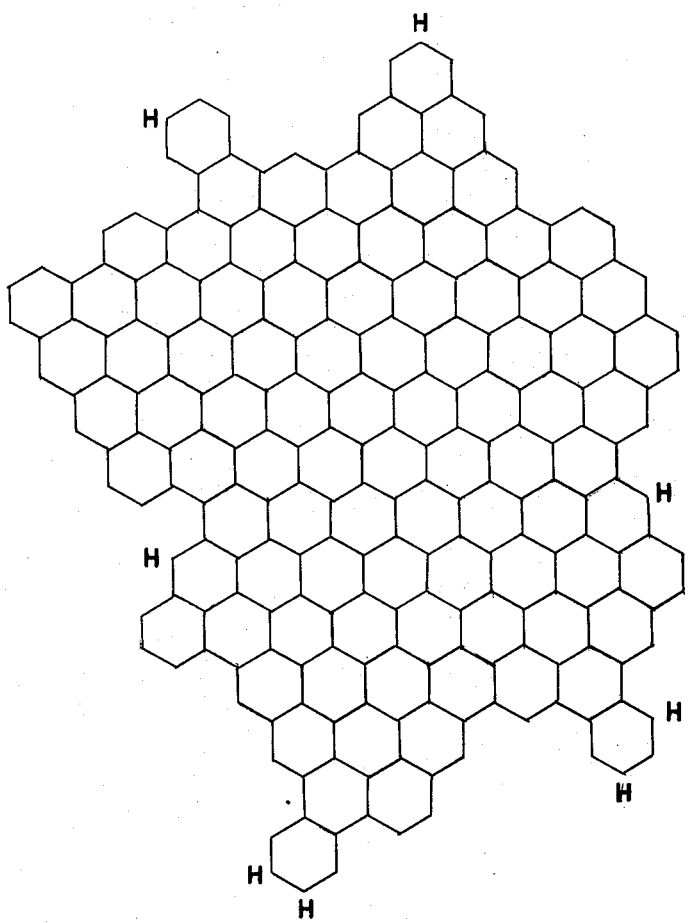
Figure 4:
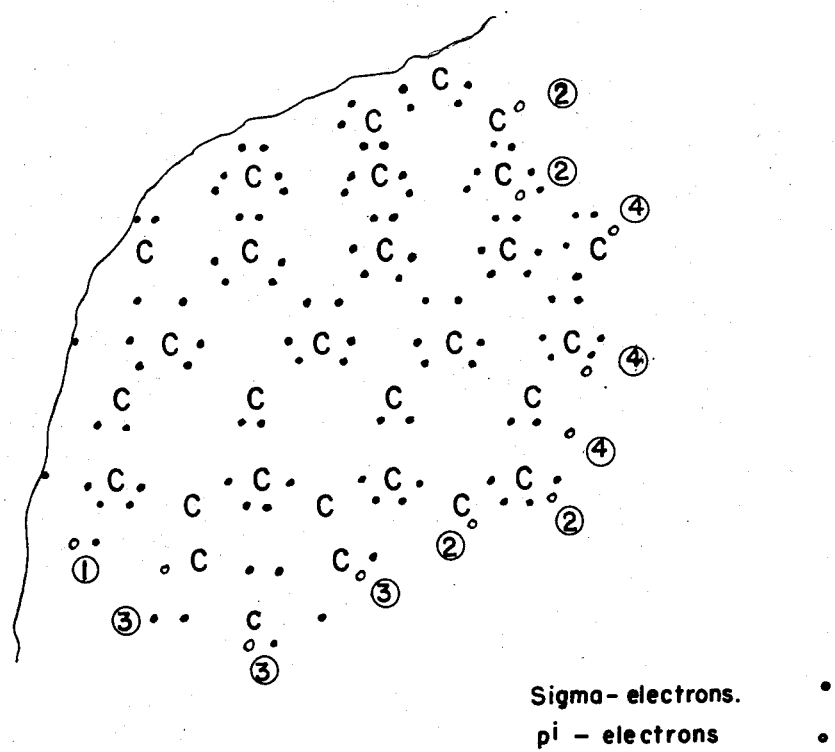

For the purpose of discussing the prior art, FIGS. 1, 2 and 3 illustrate typical layers in carbons prepared according to the prior art from carbonaceous materials at carbonization temperatures of about 400° C., 700° C. and 1300° C., respectively. FIG. 4 illustrates the electronic configuration of the aromatic ring systems of carbon crystallites showing the unsaturated valence bonds which can occur at the crystallite periphery. These figures are discussed in detail herein below.

Although a few elements can exist in several allotropic forms, the element carbon is unique in the bewildering array of distinguishably different form which it can take and which are recognized in the art as different compositions of matter; among these are:

Diamond
Graphite
Coal
Byproduct coke
Pitch coke
Petroleum coke
Wood charcoal
Bone black
Lampblack
Carbon black
Acetylene black
Active carbon Most of the classes in the foregoing list can be further divided into recognizably different forms of carbon, as for example the various kinds of diamond, of coal, of wood charcoal, of carbon black, and of active carbon.

One important difference between these materials is the content of inorganic ash which ranges from about 75% in the case of bone black at one extreme, to less than 0.1% in the case of lampblack, carbon black, or acetylene black at the other extreme, while gem grade diamonds contain only the merest trace of impurities. The quantity and nature of the ash content confers significant properties upon the material, sometimes being advantageous as in the case of bone black and sometimes being a disadvantage as in coal and coke for fuels or in graphite for lubrication.

An even more important difference resides in the manner in which the carbon atoms are joined together. In diamond, the carbon atoms are each linked to four adjoining and equidistant carbon atoms tetragonally, to form a continuous isotropic crystal. In graphite, each carbon is linked to only three equidistant carbon atoms in a planar system of hexagonal aromatic rings like the plan view of a honeycomb; these sheets of atoms are in turn stacked in parallel layers so oriented that the sides of the hexagons are parallel in all layers and further, so that the alternate layers are displaced with respect to one another to the position where half the carbon atoms are directly above a carbon atom of the layer below and half are over the center of the hexagon below. Since the carbon atoms in different layers are more than twice as far apart as those within the same layer, the forces holding the layers together are relatively weak and graphite has a characteristic flaky form.

Hexagonal rings of carbon atoms also occur in all the other known forms of carbon, but the arrangement is extremely varied and will be best understood by considering the way in which these materials are formed. When organic substances, such as woods, coals, nut shells, seed hulls, bones, resins, liquid hydrocarbons, and similar carbonaceous materials, are heated in the substantial absence of air, pyrolysis occurs disrupting the molecules with the evolution of gases and vapors; at the same time polymerization occurs joining together some of the fragments created by pyrolysis into systems of cross-linked planar condensed benzene-ring molecules. This process is referred to as carbonization or charring. The pyrolysis fragments which are driven off may range from simple molecules like water, methane and carbon dioxide to complex oils and tarry products. At first the product of carbonization consists largely of a disorganized phase, but within it are many centers of organization. These centers of organization consist of small groups of carbon atoms arranged in the typical hexagonal planar network and stacked in parallel layers. They differ from graphite in that the organized structure is very small in extent, in that the planes are slightly farther apart, and in that the planes have random rotational orientation with respect to one another. These sub-microscopic centers of organization are called microcrystals or crystallites and their semi-graphitic structure is referred to as turbostratic structure. The periphery of the crystallites is attached by chemical bonds to organic side chains as illustrated for a single plane in FIG. 1. These side chains consist of carbon and hydrogen only, or with the addition of other elements such as oxygen, sulphur, nitrogen, and phosphorus depending on the nature of the parent material.

The orientation of the planes of adjoining crystallites is completely random with respect to one another unless the structure of the parent material gives some predisposition towards a preferred orientation. Between the crystallites is a disorganized phase formed in complex fashion by the linking of the peripheral side chains to one another and/or to other masses of chain molecules which are crosslinked in a disorganized fashion. The structure described might be formed typically by carbonization at about 400° C. and such a product is refered to as a condensed molecular solid. It is black, and is loosely classed as a carbon in the art although it contains very substantial quantities of other elements.

If carbonization is continued by gradually raising the temperature, pyrolysis continues with a continuing evolution of gases and vapors as the chain molecules in the disorganized phase are progressively disrupted. The organized turbostatic structure of the crystallites gradually grows by acquisition of carbon atoms from the disorganized phase, the periphery of the crystallites grow less irregular, and the side chains become fewer and smaller. FIG. 2 illustrates in one plane the type of structure that may have been reached at 700° C.

The temperature range 500–800° C. is, in general, characterized by a large evolution of gas and by a rapid development of the turbostratic crystalline structure. The large amount of material driven off as gases and vapors during carbonization results in a shrinkage of the remaining carbonaceous mass. This loss of intervening material combined with growth of the crystallites now brings the crystallites into contact with one another at various points and C—C bonds form which hook the crystallites together at their edges although their turbostratic layers are not coplanar. There is still an extensive disorganized phase between the crystallites which now contains carbon of tetrahedral valency as well as some remaining cross-linked chain molecules.

At higher temperatures the disorganized phase becomes predominantly carbon. FIG. 3 illustrates the crystallite plane in a coke formed at 1300° C. in which the crystallite planes have now grown relatively large and the side chains have disappeared, although there is still a little hydrogen bound to the carbon here and there.

At temperatures in the range 2000 to 3000° C. the carbon atoms acquire enough thermal energy to migrate fairly readily. This permits more rapid growth of the aromatic hexagonal structure. After these layers pass some minimum size, which may be about 100 A.U. diameter, the collective attraction of the carbon atoms in adjoining planes is sufficient to cause the planes to rotate into the specific orientation required for graphite. Thus there is a gradual transformation of the turbostratic carbon into polycrystalline graphite, a process which is called graphitization.

We have, then, a progressive series of carbons ranging from condensed molecular solids through baked carbons to polycrystalline graphites. The transitions from one range to another are very gradual so that broad class names do not have clearly defined significance, but in general: "chars" may be considered condensed molecular solids formed at temperatures up to 600–700° C.; "cokes" may be considered products in which substantial amounts of elemental carbon exist in the disorganized phase, corresponding to terminal carbonization temperatures of roughly 700–1000° C.; materials heat treated between 1000–2000° C. may be called baked carbons; those in the range 20000–2500° C. are partially graphitized carbons; and those above 2500° C., polycrystalline graphite. It should be understood that the duration of the heat treatment and the nature of the parent material will modify these ranges somewhat and further that the terminology which has grown up in the art is based on common usage rather than a well reasoned scheme of nomenclature.

When the mass passes through a fluid stage in the early part of the carbonization process, the resulting cokes are called soft cokes. When there is much cross linking of the side chains it prevents the formation of a fluid stage during carbonization and the resulting material is called a hard coke. Cross linking also inhibits the reorientation of the turbostratic sheets of hard cokes into the graphite structure at temperatures above 2000° C., while the relative absence of cross linking in soft cokes makes them readily graphitizable.

Still other types of carbons are formed by incomplete combustion, or by the pyrolysis in the substantial absence of air, of hydrocarbon gases or hydrocarbon vapors. Typical products of this type are lampblack, acetylene black, channel black and furnace black. The mechanism of formation of these products is not so well understood as in the case of the products of carbonization, but these products are carbons having turbostratic crystallite structure with varying quantities of hydrogen still attached.

It should also be mentioned that carbonaceous materials can be charred with relatively little application of heat by the use of dehydrating acids such as sulphuric and phosphoric acids.

The inorganic ash in chars and cokes is not merely an inert diluent. The development of specific properties in carbon is affected by the presence of mineral salts. In some cases the mineral ingredients provide a skeleton on which the carbon is deposited, the freshly formed carbon becoming bonded by adsorption forces or by chemical bonds to the mineral elements. In some cases this bonding is so strong that normally soluble inorganic substances cannot be extracted with water; in other cases the mineral ingredients may be dissolved in acid or water leaving the exposed carbon surfaces free for adsorption sites. Some elements such as potassium can penetrate between the planes of the crystallites, spreading them apart and thereby changing their properties. A considerable number of materials are known which can react in this way with graphite and similar reactions are to be expected with the turbostratic crystallites.

Any given carbonaceous starting material will yield a range of products, each a distinct composition of matter, depending upon the temperature and duration of the heat treatment it has received. Furthermore each different starting material will result in a different product or products since their different chemical structures lead to different pyrolytic fragments, to different polymers in the condensed molecular solid, to different side chains on the crystallites, to different sizes and rates of growth of the crystallites, to different arrangements of the crystallites as they hook themselves together, to different arrangements of the tetragonal carbon linkages in the disorganized phase, to differences in the nature, amount, and arrangement of other elements such as oxygen, nitrogen, sulphur and phosphorus in the various structures, to differences in the type and amount of inorganic ash which is present, and to differences in the way in which the ash or part of it is combined with the carbon or otherwise intimately linked into the structure.

It is not surprising that this wide range of variables, which can be combined in an endless variety of ways, results in a substantial array of carbons which are sufficiently different to constitute separate and distinct compositions of matter. Because the differences in structure are largely submicroscopic, they cannot usually be identified and described in sufficient detail to permit of a unique description of the composition of matter in terms of molecular structure or in terms of the geometric arrangement of the constituent atoms. Although the distribution and arrangement of the crystallites has been described as random, and although the structure of the disorganized phase has also been considered random, they are by no means completely so. Any specific raw material combined with any given specific and closely controlled series of processes or treatments will result in an essentially reproducible product with distinctive properties which describe it uniquely and which must result, therefore, from a structure which, although somewhat random, has statistically reproducible characteristics. In some cases the differences in properties are only matters of degree, but where the differences are distinctly differences in kind, the substances which possess these distinctly different properties must be distinctly different compositions of matter. Although they are differentiated by their properties, because their microstructure is not available as a basis for description, they are most uniquely and specifically defined by stating the parent material and the detailed method of manufacture.

The properties which may be used to identify and distinguish carbons include the following:

Nature and amount of inorganic ash
Amounts of chemically combined hydrogen, oxygen, nitrogen, sulphur and phosphorus
Size of particles
Morphology of the particles under optical microscope or electron microscope
Size of crystallites
Bulk density
Porosity
Internal surface area
Hardness
Mechanical strength
Thermal conductivity
Thermal expansion Thermoelectric power
Electrical resistivity
Hall coefficient
Paramagnetic resonance
Diamagnetic susceptibility
Adsorptive properties Some of these properties originate in the electronic structure of carbon. Each carbon atom has four valence electrons which can combine with valence electrons of other atoms to form electron pairs, each electron pair constituting a chemical covalent bond. In diamond, or for those carbon atoms in the disorganized phase which are tetragonally linked to their neighbors, all of the valence electrons are utilized in forming four covalent bonds per atom. On the other hand, in graphite and in the turbostratic crystallites of the amorphous carbons, only three covalent bonds are formed per carbon atom; the three electrons so utilized are called sigma-electrons. The extra electron of each carbon atom is called a pi-electron. It is the six pi-electrons in the benzene structure which provide the resonating double bonds. In graphite and in turbostratic crystals the layers are too far apart for these pi-electrons to form covalent bonds; but they are largely responsible for the Van der Waals forces holding the planes together and for the formation of lamellar compounds such as those formed when potassium atoms penetrate between the aromatic planes. Because of these pi-electrons carbons are semi-conductors; the distribution of thermal energy at any given temperature above absolute zero is such that some pi-electrons have enough energy to be lifted out of their bound state into the conduction band where they are free to move if subjected to an electromotive force, as in the resistivity test.

When the side chains are driven off from the edges of the crystallites by heating, some carbon atoms around the periphery are left connected to only two carbon atoms as illustrated in FIG. 4. Consequently some of their sigma-electrons are left unpaired. Since the sigma state has a lower (more stable) energy level than the pi state, available pi-electrons now transfer into the vacancies in the sigma state, forming spin pairs with these surplus sigma-electrons on the peripheral carbon atoms. Removal of these electrons from the pi-band leaves "holes" which are potential carriers of positive current. Hence the removal of side chains by heat treatment is reflected in a decrease in electrical resistivity as is well known to those experienced in the art. The Hall effect and the thermo-electric effect both depend upon the reciprocal of the number of carriers, so these too will be experimental measures of the relative number of sigma-traps for pi-electrons which exist on the peripheral carbons. A similar situation will exist wherever in the disorganized phase a carbon atom has not found its full complement of three adjoining carbon atoms with which to combine as the hydrocarbon chains have been disrupted and volatilized. The frequency of occurrence of such unsaturated carbon atoms will depend uniquely upon the structure of the raw material and the processing it has undergone, although we cannot see into the fine structures of these materials sufficiently to be able to describe the structural relationships in detail.

When a pi-electron combines with a peripheral sigma-electron to form a spin pair, this configuration is sufficiently stable that this carbon atom, although all its valencies are not satisfied, will not readily react chemically; that is, a large amount of activation energy is required to alter this fairly stable configuration. However, the resulting lack of uniformity in the distribution of the electron charge about these peripheral carbon atoms increases the Van der Waals forces, which are available to hold atoms and molecules in a looser form of bonding which is known as adsorption.

Adsorptive properties are, therefore, dependent upon the number of unsaturated carbon atoms which are present. FIG. 4 illustrates the peripheral carbon atoms in a single turbostratic plane. The sigma valence electrons are represented by black dots; the pi valence electrons are not shown, since they normally occupy positions above and below the turbostratic plane, except where they have formed spin pairs with the surplus sigma-electrons of unsaturated carbon atoms—these pi-electrons are shown as open circles. It will be noticed that the unsaturated carbons can occur as single atoms, as pairs of adjoining atoms, or as four adjoining atoms in the same hexagonal ring (as indicated by the circled numbers in FIG. 4). As the number of unsaturated carbon atoms in the ring increases, the surrounding force field is altered, thereby providing a variety of different adsorption sites. Similar but more complex situations can occur in the case of the unsaturated carbon atoms which form the adsorption sites in the disorganized phase.

Further, it must be possible for the adsorbate to be able to reach the active centres; consequently a microporosity of the particle is necessary which will allow the adsorbate to penetrate to active centers throughout the whole mass. Neither microporosity alone nor active centers alone is enough to give a highly adsorptive material, but only the combination of them. Just as formation of active centers depends upon the raw material and the processing, so does microporosity depend upon the carbonaceous base material and upon the treatment it receives. The size of the pores is also important since pores that will admit a simple molecule like water, chlorine, or iodine into the centre of the mass may not be adequate to make the inner surfaces available to a larger molecule like benzene or phenol, or to a much larger molecule like methylene blue. Furthermore, the adsorbent carbons presently known to the art are not pure carbon but are formed at temperatures below those at which all the side chains and hydrogen are driven off. Their adsorptive properties are therefore the result of an exceedingly variable and complex structure of carbon and hydrogen in combination with varying amounts of one or more of oxygen, nitrogen, sulphur, phosphorus, and inorganic ash of various kinds. Not only carbon atoms may have unsaturated valencies, but also nitrogen, sulphur and phosphorus, thus providing additional and different adsorption sites. The size and shape of the pores through which the adsorbate must pass is also modified thereby. Further, steric hindrance can be a factor of major significance in determining what molecules can have access to adsorption sites on an actual carbon of a given composition and internal structure. Introduction of non-carbon elements into the structure can lead to electrical polarization of specific parts of the structure, with consequent changes in the Van der Waals forces and the resulting adsorption properties.

The adsorptive power of a carbon may be measured by determining the amount of a test material which is adsorbed per gram of carbon under a standardized set of test conditions. The heat of wetting of the carbon by a liquid is a meaure of the tenacity with which the vapors of that liquid will be held on the carbon after adsorption. Both of these properties will vary from one adsorbate to another and also from one carbon to another, both variations being a reflection of differences in the structure of the carbon.

In view of the foregoing partial discussion of some of the factors which affect adsorption properties of an active carbon, it is not surprising that it is well recognized in the art that the structure of the carbonaceous raw material has a specific hereditary effect upon the properties of the resultant char. For example, U.S. 2,003,278 refers to the fact that the original cell structure of hardwood is retained in the activated charcoal. It is well known that coconut shells yield a strong, dense carbon suitable for gas adsorption, while cellulose forms a soft bulky carbon for water purification use. Nut shells, wood, and cellulose, when carbonized, shrink but remain rigid and retain a resemblance to the original structures. Molasses, tars, and pitches from a solid foam due to solidification during the escape of gases from the plastic mass. The structural differences in some active carbons are, therefore, visible to the unaided eye; others will reveal differences under the optical microscope, and still others show differences under the electron microscope.

Figure 6:
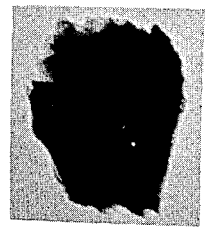
Figure 7:

Soft cokes, but not hard cokes or carbon blacks, show a lamellar structure under the electron microscope, as illustrated by FIGS. 6 and 7. When viewed edgeways, the lamellae appear as alternating strips of high and low density. When viewed on the flat, there are areas of different density due to a shingle-like effect where all the lamellae do not extend the same distance towards the edge of the particle. The outline of such particles is characterized by many fairly straight edges when viewed on the flat or by a scalloped effect when the lamellae are viewed edgeways. These effects are only observed when the particles are thin enough at the edges to be semi-transparent and when the particles happen to be so oriented in the electron microscape that these special views of the structure are apparent. Since the spacing of the lamellar sheets is usually of the order of several hundred Angstrom units, this property is only visible in particles having dimensions several times this magnitude. This structure is found in all soft cokes and in a few active carbons, notably those which have been made from soft cokes such as petroleum coke. This structure occurs because the fluid stage of carbonization gives the centres of organization an opportunity to align themselves in parallel planes. This structure is not found in hard cokes.

The hardness, or attrition resistance, of the carbon particles, as produced, reflects the strength of the forces holding the particle together and is, therefore, a reflection of differences in the structure of the carbon. These differences are one of the hereditary legacies of the structure of the parent materials; for example active carbons produced from coconut hulls are noted for their exceptional hardness.

The size of the carbon crystallites may be determined by X-ray diffraction techniques. The position and width of the (002) line, which occurs at a scanning angle ($2\theta$) of about 26°, is determined by the spacing and number of the aromatic planes in the crystallite stack. The diameter of the planes may be calculated from the shape of the asymmetric (10) and (11) lines which occur at scanning angles of about 43° and 77° respectively. The order of magnitude of typical crystallite size is 4 layers of 40 A.U. diameter for a hard carbon heat treated to 1400° C., increasing to 25 layers of 90 A.U. diameter when heat treated to 2800° C.; whereas a soft carbon heat treated to 1100° C. would typically have about 5 layers of 30 A.U. diameter increasing with heat treatment at 2300° C. to hundreds of layers of about 200 A.U. diameter.

The distribution of electrons in the crystallite results in another measurable property called paramagnetic electron spin absorption or, more simply, "magnetic resonance." In all types of carbon known to the art, which have been formed from organic matter at temperatures approximately in the range 350° C. to 900° C., magnetic resonance is observed due to the trapping of a large number of unpaired electrons in the carbon structure. It is generally understood that some of the sigma-electrons do not pick up pi-electrons to form spin pairs. Because these sigma-electrons are potentially available to catch pi-electrons, they are sometimes referred to as "sigma traps"; because these unpaired sigma-electrons are potentially available to form chemical bonds, they are sometimes referred to as "free radicals"; because these sigma-electrons are potentially available to form a pair with an electron having opposite spin, they are sometimes referred to as "free spins." The number of free spins depends upon the highest temperature to which the carbon has been heated and at about 520° C. heat treatment reaches a maximum concentration of about $2 \times 10^{20}$ free spins per gram of carbon; that is, about four carbon atoms per thousand carry an unpaired electron. It appears to be the breaking of peripheral bonds during carbonization that provides these free spins and it appears to be the aromatic condensed ring structure which provides the mechanism to stabilize them.

In the solid state the perturbing effect of surrounding atoms tends to destroy the contribution of an electron's orbital momentum to the magnetic moment so that the magnetic moment of a specimen is determined almost entirely by the spin moments of the unpaired electrons. Like all atomic phenomena, the energy levels of these electrons are quantized and hence have resonant frequencies. When a paramagnetic substance is placed in a static magnetic field and is subjected to electromagnetic radiation of gradually varying frequency, an "absorption line" occurs, at the resonant frequency, which can be observed and measured with suitable apparatus. In practice, the frequency is held constant and the strength of the magnetic field is varied, from which is obtained a plot of rate of electromagnetic power absorption in relation to the static magnetic field applied. A mathematical analysis of the resulting curve enables one to determine the relative contributions of orbital and spin paramagnetism and the number and distribution of the paramagnetic centers. As a practical matter oxygen and nitrogen must be excluded from the sample during resonance measurements since these paramagnetic gases substantially effect the results. Chlorine, on the other hand, does not interfere.

Paramagnetic resonance is a general property of organic compounds carbonized below 900° C. It is always observed, for example, in carbonized coals, carbonized resins, charred sucrose, wood charcoal, petroleum coke, carbon black, and activated carbons. A second paramagnetic resonance peak, which is thought to be due to electrons in the conduction band, is found above about 1500° C. heat treatment.

Successful methods of manufacturing active carbons which are known to the art are extremely varied but have certain basic similarities in raw materials and process methods which are recognizably characteristic of all known methods.

The raw materials employed are carbonaceous materials, a broad term which includes all carbon-containing materials of plant or animal origin, including such fossil forms as lignite, coal, petroleum, and natural gas, and which also includes organic chemicals generally, by which we means compounds of carbon and hydrogen with or without the presence of additional elements. Usually the materials used are organic high polymers, either natural or synthetic, such as bones, wood, nut shells, and synthetic resins; by-product or waste forms are particularly desired because of their low cost and lead to the use of such natural materials as distillery waste, bagasse, beet-sugar waste, corncobs, seed hulls, leather waste, rubber waste, lignin in the form of paper mill waste, molasses, and sawdust; lignite, coal and petroleum coke are all used commercially; carbohydrates, especially in the form of cereal grains have been recommended; one of the few isolated organic compounds which has been, and is, used is cane sugar. It is noteworthy that inorganic compounds of carbon are not included among the useful starting materials.

The first step in the manufacture of an active carbon is any of the successful methods known to the art is decomposition of the carbonaceous material, a step which is commonly called carbonization. Carbonization is usually carried out by thermal decomposition in the absence of air or with a major deficiency of air, but it may be carried out by chemical charring, as with phosphoric acid, in which case some application of heat is usually employed. The temperature at which carbonization is terminated depends somewhat on the raw material being used, upon the chemical agents employed, and upon the subsequent activation process. It is generally recognized in the art that carbonization temperatures in excess of about 600° C. will reduce the adsorptive power of the final product, although in a few cases temperatures as high as 900° C. are mentioned.

The char resulting from a simple carbonization operation usually hase some adsorptive power, especially if most of the volatiles have been driven off, but the adsorptive power developed at this stage is too low to be of practical value unless some activation has been carried out simultaneously by admitting limited quantities of air during carbonization as in the preparation of active bone char or sugar char. However, in a morification of the process, dehydrating salts such as the chlorides of zinc, calcium or magnesium are added to the carbonaceous raw material and are washed out after carbonization; the resulting chars from suitable raw materials, which are usually cellulosic, have substantial adsorptive power without actviation, although in practice an activation step is often added.

It has long been recognized that the adsorptive power of most chars can be greatly increased by a controlled oxidation of the char. There are a number of basically different ways of doing so, and these processes are collectively called activation processes. This controlled oxidation removes some of the char developing a very porous structure and increasing the accessible surface area. The char is a condensed molecular solid and it is probable that the controlled oxidation attacks the chain molecules in the disorganized phase, opening up pores through the mass and stripping off material which leaves unsaturated carbon atoms as active adsorption sites. The results obtained are unique for each parent raw material, for each prior carbonization treatment, and for each variation in activation treatment.

The commoner processes are gas-activation procedures in which the car is treated with steam or carbon dioxide at temperatures between 800° C. and 1000° C. Although higher temperatures are mentioned in the literature it is generally recognized that temperatures above 1000° C. decrease the adsorptive power. At temperatures below about 800° C. the oxidizing action of steam or carbon dioxide is too slow to be practical. Other gas-activation processes use air in limited quantities, usually at temperatures below 600° C.; such an activation method is sometimes incorporated in the carbonization step as was mentioned above.

Other activation processes employ solid chemical substances: incorporation of magnesium or calcium carbonates liberates carbon dioxide which, as before, is the active oxidizing agent; incorporation of sulphates in the mass results in oxidation by the sulphate, which is itself reduced to the sulphide; phosphoric acid, with or without the addition of sulphuric acid, or phosphate salts are also employed as oxidizing agents.

Various other chemicals such as caustic alkalis, sulphides and thiocyanates are utilized in either the carbonization and/or the activation steps because they erode the condensed molecular solid by chemical reaction producing a more porous structure.

The duration and nature of the activation step depends upon the end use of the desired active carbon. All of the activation processes result in loss of material which may range from 20% to more than 50% of the weight of the char. This substantial reduction in the yield of finished product is a major factor in the economics of active carbon production and is a major disadvantage of all the activation processes known to the art. The removal of material by activation also reduces the density and the mechanical strength of the finished active carbon; both of these tendencies are undesirable for certain types of end-use and must be balanced against the gain in adsorptive power in determining the optimum amount of activation.

For some purposes active carbons are desired having only small amounts of inorganic ash and for many purposes it is desired that they be neutral in aqueous suspension. Since almost all practical carbonaceous materials contain substantial quantities of inorganic ash, special treatments are required in such cases to reduce the ash content. Special treatment is also necessary to produce neutral carbons, since the products of carbonization and of activation are usually alkaline, although occasionally acid, in their reaction.

The production of silicon tetrachloride by the reaction $$SiC + 2Cl_2 \rightarrow SiCl_4 + C$$

at temperatures above 1000° C. was disclosed by Hutchins in 1918 (U.S. 1,271,713) and the commercial production of silicon tetrachloride by this reaction is well known to the art. Lower reaction temperatures of about 800–900° C. are preferred in order to simplify construction and operation of the equipment but at these lower temperatures, once the surface of the silicon carbide particle has been converted to a layer of carbon, the reaction proceeds too slowly to be completely satisfactory. Andersen (U.S. 2,739,041) has disclosed a process in which periods of chlorination are alternated with periods in which air is blow into the hot reactor to remove the carbon by combustion. In the present state of the art the carbon is always burned off or, still saturated with chlorine, is discarded as waste. Hutchins disclosed that the carbon residue is in the form of graphite—a form of carbon which is not surface active.

It is an object of this invention to produce active carbon and metal or metalloid chlorides simultaneously, thereby effecting economies as compared to preparation separately of either active carbon or metal (metalloid) chlorides by methods which are presently known to the art.

It is a further object of this invention to prepare active carbon from inorganic raw materials, namely metal carbides or metalloid carbides, which can be made available in unlimited quantities, which are domestically available, and which are essentially uniform in quality.

It is also a purpose of this invention to produce active carbon by a process which does not use, nor require, gas activation processes such as high temperature oxidation with steam or with carbon dioxide, and which does not use activating chemicals such as calcium, magnesium or zinc chlorides, alkali metal sulphates, phosphoric acid, caustic soda or potash, sulphides, thiocyanates, or similar chemicals.

Additional objects of this invention are to produce directly an active carbon with low ash content without the necessity of separate ash removing processes, and to produce a carbon which is neutral in aqueous suspension. It is an object of this invention to produce an active carbon in granular form suitable for gas adsorption uses and to produce a pulverized carbon suitable for liquid phase applications.

It is also an object of this invention to produce, as a new composiiton of matter, a carbon having properties, physical form, and structure differing from those previously known to the art.

It has now been discovered that the carbides or carbonitrides of metals or metalloids having volatile chlorides can be chlorinated to produce the corresponding chloride and to leave a carbon residue which, when dechlorinated, is a highly adsorbent active carbon. Commercially common examples of this class of metals or metalloids are aluminum, boron, silicon, titanium and zirconium.

For convenient reference, the active carbons previously known to the art, formed by the carbonization of carbonaceous matter, will be called "organic active carbons"; and the new composition of matter which I have invented, formed by chlorination of carbides or carbonitrides of metals or metalloids having volatile chlorides followed by dechlorination of the residual carbon, will be called "mineral active carbon."

Figure 5:

FIG. 5 is an optical photomicrograph at 330× magnification showing the laminated structure of a typical mineral active carbon according to the invention. FIGS. 6 and 7 are electron photomicrographs at 37,350× magnification showing the lamellar fine structure of a typical mineral active carbon, FIG. 7 being an edge view of the lamellae and FIG. 6 being a flat view.

It has been discovered that mineral active carbon prepared without any special activation procedures such as are frequently employed in making organic active carbons has gas adsorption and organic vapor adsorption properties comparable to, or superior to, gas-activated organic carbons presently offered commercially for these purposes. It also has adsorption properties in aqueous systems comparable to, or superior to, commercial decolorizing organic active carbons.

Only about one commercial activated carbon type in four has an inorganic ash content less than 2% by weight and only about one in ten has an ash content below 1%. Ash contents in the range 1–2% may conveniently be referred to as "low" and those below 1% as "very low." It has been found that the inorganic ash present in mineral active carbons forms a mineral skeleton holding the carbon granule together. Since the hardness and attrition resistance of the carbon granules depend upon the nature and quantity of the ash content, a low ash content is not always desirable. But when end use requires a carbon with ash in the "low" or "very low" range, it has been discovered that mineral active carbon can be prepared in these grades. It has also been found that mineral active carbon can be produced in a grade which is essentially neutral in aqueous suspension. It has been found further that mineral active carbon has a combination of properties identifying it as a new composition of matter as, indeed, it must be because of its novel method of preparation.

Mineral active carbon is prepared by chlorination of the carbide or carbonitride of metals or metalloids having volatile chlorides at an elevated temperature with separation of the chloride co-product and dechlorination of the residual carbon either by sweeping the reactor with inert gas during cooling or by dechlorination of the cool chlorine-saturated carbon. Dechlorination is an essential step because the product cannot be surface active until the chlorine which is present in situ during its formation is removed. Furthermore, the carbon should be dechlorinated before it is exposed to moist air because such moisture will react with the chlorine on the carbon forming hydrochloric acid which would also be adsorbed and which would make the carbon difficult to handle and useless for practical purposes until it, in turn, was removed.

Even though the carbon might conceivably be dechlorinated as the initial step in its utilization, it is obvious that it would be impracticable to package chlorine-containing carbon because of corrosion of the containers, because of need for pressure containers due to release of chlorine from the packaged carbon by ambient temperature changes, because the product would then have to be shipped and handled as a toxic material, and because abnormal corrosion problems would be created in use. Obviously, too, chlorine-containing carbon cannot be used in gas fractionation operations, solvent recovery operations, cylinder storage of industrial gases, air purification, purification of pharmaceuticals, of food products, and of organic chemicals generally, in dry cleaning solvent purification systems, or in general in the types of application in which active carbon is normally employed, because in all cases it would contaminate and/or damage the product. It would also be uneconomic not to dechlorinate the carbon since each ton of carbon saturated with chlorine would hold more than half a ton of chlorine.

The necessary conditions for the chlorination reaction are to provide enough heat to get the reaction started and then, since the reaction is exothermic, to dissipate the heat released by the reaction. Any suitable form of apparatus may be employed utilizing either a static or fluidized bed according to engineering principles which are known in the art. For any selected form of apparatus and method of operation there will be a reaction rate, for any given reaction temperature, at which heat is evolved at the same rate as the apparatus is able to dissipate it; below this rate it will be necessary to supply heat to the system in any convenient manner and above this rate temperatures in the reaction zone will rise above the selected value. Since reaction rates increase with increasing temperature and since this in turn raises the temperature further, there is a tendency for the reaction to "run away." Fortunately close temperature control is not essential. Apart from engineering provision for the dissipation of heat, the rate of reaction can be held in check by controlling the rate at which chlorine is made available to the reaction zone, as for example by throttling the chlorine feed rate or by diluting the chlorine with an inert gas. For the same reasons, there is a tendency for the reaction to run away in localized regions of the reaction zone forming hot spots. It has not been found necessary either to measure temperature accurately or to control it accurately. Because of temperature variations both in space and time, temperature values given in this disclosure are only average values accurate to about ±50° C. Carbon with good adsorptive power may be produced from silicon carbide at a reaction temperature of 800° C. but the time required for the chlorination is quite long as was disclosed by Andersen; but with a different objective in view, namely the production of both silicon tetrachloride *and* active carbon, 800° C. is a feasible operating temperature and one at which temperature control problems are greatly reduced. Higher operating temperatures, especially those above 1000° C., have the advantage of greatly reducing the time required to complete the reaction, but at these higher temperatures special precautions are necessary to keep hot spots and, indeed the whole temperature level, under control and better refractories are required than have conventionally been employed in the art of manufacturing silicon tetrachloride. Mullite, zircon, and graphite have proved to be suitable refractories for containing this reaction at temperatures in excess of 1000° C. Carbon with substantial adsorptive power can also be produced from silicon carbide at 1650° C. but the higher temperatures tend to favor growth of the turbostratic crystallites at the expense of the disorganized phase with consequent reduction in microporosity and number of active sites. Temperatures in the range 900° C. to 1200° C. are considered optimum for chlorinating silicon carbide from the standpoint of maximum adsorptive power of the carbon, but various adsorptive powers are commonly employed for varied uses so that engineering convenience and economy may dictate any choice of temperature in the range 800° C. to 1800° C. depending upon the type of apparatus employed. Several laboratory runs were carried out with silicon carbide at temperatures which melted the containing mullite tube (M.P.~1650° C.) and the resulting carbon was found to be quite surface active although past optimum adsorptive properties. The lower limit of the temperature which may be employed depends upon the reactivity of the particular metal or metalloid carbide or carbonitride which is being used, and in general may be any temperature which gives a practicable rate of reaction. Titanium, zirconium, aluminum, and boron carbides, and zirconium and titanium carbonitrides all react readily at temperatures below those necessary for silicon carbide so that less refractory materials may be used for the reaction chamber and temperature control is facilitated.

Any convenient chlorine feed rate may be used which meets the needs of temperature control. In order to reduce hot spots in the reaction zone additional gas may be passed through the reaction zone to carry heat away from the hot spots. This additional gas may be either an inert diluent as previously mentioned or merely additional chlorine; in the latter case, after removing the silicon tetrachloride, the excess chlorine may be recycled or used for other purposes. If the reaction zone is a fluidized bed, then the chlorine rate, with or without diluent, must also meet the physical requirements of fluidization control. Fluidization, of course, greatly improves heat transfer and eliminate hot spots. At the lower operating temperatures hot spots are not likely to be a problem. When troublesome they can be eliminated by equipment design alone but suitable heat dispersal by gas flow may preferably be combined with other design features to meet the desired objectives.

Although many metal or metalloid carbides or carbonitrides may suitably be used as raw material, silicon carbide has been selected to illustrate the novel process of our invention in detail. Any silicon carbide raw material may be used. Low quality grades such as firesand will result in a lower quality carbon containing considerable silica, but for some purposes this may not be undesirable. The principal impurities in silicon carbide are carbon, elemental silicon, silica, calcium, iron and alumina. In the chlorination process the silicon and silica are converted to silicon tetrachloride; the iron, and some of the alumina are converted to chlorides which are volatile at the reaction temperatures and are thus removed from the reaction zone. These metal chloride impurities are readily removed from the silicon tetrachloride co-product by conventional means. Abrasive grade black silicon carbide contains very little carbon and silica and is an eminently suitable raw material for the process. Green silicon carbide is an even purer starting material yielding maximum purity of product.

Any convenient size of silicon carbide can be used. There have been used abrasive grit numbers 8 through 240 in static beds and even finer sizes may be used in fluidized beds. If the particles are too large the time for complete reaction is unduly prolonged, but since crude silicon carbide contains few crystals which are much coarser than 8 mesh only a simple crushing to break apart the friable crude mass is needed. Since the size of the silicon carbide crystal substantially determines the size of the carbon particle, the size of silicon carbide selected will be considerably influenced by the size of carbon particle which is desired.

There is a tendency for an unreacted core of silicon carbide to remain at the center of the carbon particle due to the slow diffusion of chlorine into, and the slow diffusion of silicon tetrachloride out of, the inner part of the reacting particle. Both diffusion and reaction are accelerated by increased temperature and we have found that operating temperatures in excess of 1000° C. are beneficial in eliminating unreacted cores. For this reason hot spots are beneficial provided that they are not excessive. Any cyclic change in reactor temperature or pressure will expedite diffusion by causing the particles to "breathe"; rising temperatures or falling pressures drive the silicon tetrachloride product vapors out of the interior of the particle while during the other half of the cycle falling temperatures or rising pressures pull the chlorine reactant into the particle to the unreacted silicon carbide core. Since hot spots represent regions of abnormal temperature change they tend to contribute in this way too, to complete reaction of the core. Changes in reactor pressure are readily provided by valving the inlet and outlet gases of the system.

When some inert silicon carbide core in the carbon particle is not objectionable, as for example when the carbon is to be used as a catalyst support, the reaction time may economically be shortened somewhat. Further, when the carbon is to be used as a fine powder, unreacted silicon carbide can be separated from it in a subsequent mechanical process: the relatively friable carbon is broken away from the hard silicon carbide core by a mild pulverizing action and the two components of different density and size may then be separated by any convenient means known to the art such as by screening or by fluid medium separation processes.

The silicon tetrachloride formed in the reaction passes out of the reaction chamber, is condensed, and purified by known means. Because silicon tetrachloride reacts extremely readily with moisture, forming silica and hydrochloric acid, moisture must be carefully excluded from the process. Commercial chlorine may contain traces of moisture which, reacting with the silicon tetrachloride within the carbon particle, precipitate some silica in the carbon. Although commercial chlorine is found satisfactory it may be desirable to dry it under special circumstances where considerable excess chlorine is being used or where an extremely pure product is required.

At the end of the chlorination operation the carbon is saturated with chlorine at the reaction temperature and, as disclosed above, this chlorine must be removed before a useful active carbon can be obtained. Dechlorination may be accomplished in several ways. The carbon may be cooled from the reaction temperature in an atmosphere of chlorine and may subsequently be dechlorinated; or in inert gas, as for example nitrogen or argon, may be introduced into the reaction vessel, to sweep out the chlorine, at any stage of the cooling period. At room temperature, essentially all of the chlorine will be removed by the inert gas stream at atmospheric pressure. The duration of the dechlorination operation depends upon the temperature and the pressure; subatmospheric pressures will favor lower temperatures or shorter times. For rapid and complete dechlorination at atmospheric pressure a temperature of 150° C. with a moving gas stream is satisfactory. When the dechlorination is carried out at temperatures below the combustion temperature of the carbon, it is quite satisfactory to employ a stream of air, preferably dried, instead of the inert gas. Or a stream of steam may be employed at temperatures high enough to avoid condensation in the carbon and low enough to avoid oxidation of the carbon. Carbon dioxide may be used at temperatures low enough to avoid oxidation of the carbon.

Of considerable importance is the silicon tetrachloride which remains trapped in the carbon when the reaction is complete, since upon exposure to the air it hydrolyzes depositing silica and hydrochloric acid in the carbon. This silicon tetrachloride may, or may not, all be removed by the dechorination process. In any event the silicon tetrachloride must be removed before exposure to the air, if its hydrolysis is to be avoided, whereas dechlorination is not so limited. The silicon tetrachloride is readily removed by any cyclic fluctuation in temperature or pressure which causes the carbon particle to breathe while gas is passed through the vessel to sweep away the silicon tetrachloride; such processes are here referred to as "purging." The gas employed for purging may be either chlorine or an inert gas such as nitrogen or argon, or, when operating at temperatures below those at which combustion occurs, dry air may be used. Any convenient temperature may be employed for this purging operation from room temperature to temperatures in excess of the reaction temperature. If carried out at the same time as dechlorination, such purging cycles assist in removing the chlorine too.

Dechlorination may also be carried out by heating, without a gas stream, thin layers of carbon at a temperature of 100° C. or higher, but preferably in the range 200–300° C.

If the carbon has been cooled in an atmosphere of chorine, or if the cooling has occurred in the presence of an inert gas or air but in such a way that the dechlorination is incomplete, the carbon may be dechlorinated by one of the processes described above or by one of the wet processes described below, or by any convenient combination of them. Dechlorination may be carried out by washing the carbon with water. Dechlorination may be carried out by washing in alkaline solution such as aqueous caustic soda, sodium bicarbonate, or ammonia, followed by water washing, with or without acid neutralization of residual alkaline solution and final water washing. Dechlorination may to effected by treating the carbon with aqueous reducing agents such as thiosulphate, hyposulphite, bisulphite, or hydrogen peroxide followed in each case by water washing, with or without destroying the excess reducing agent by addition of a suitable oxidizing agent followed by final washing.

At the end of the chlorination operation chloride molecular species of undetermined composition, other than silicon tetrachloride, may be present in the carbon. These are probably subchlorides of silicon and/or of carbon. Carbons made without special precautions to remove the residual chlorides from the carbon have a pH in aqueous suspension of about 2 to 3. These acidic mineral active carbons have excellent adsorption properties and may be used for many purposes. The mineral active carbon, if desired, may be brought to within about one pH unit of neutrality by any of the wet dechlorination methods described in the preceding paragraph, except by thiosulphate or by hyposulphite. pH is also raised, and chloride is removed from the carbon, by heating in an inert gas stream; the temperature employed depends upon the amount of improvement desired in the purity of the mineral active carbon, temperatures in excess of 250° C. usually being preferred. This purification operation may readily be combined with dechlorination by a heated gas stream by prolonging the treatment time beyond that required for dechlorination only and it may take the form of a purging operation using cyclic temperature or pressure variations. Any suitable gas may be employed which is inert at the temperature in question, as for example, nitrogen or air.

The chlorination step can be carried out as a batch process, as a continuous process or as a semi-continuous process with intermittent feed and/or discharge. Dechlorination and/or purging and/or purification using a gas stream may be combined with these chlorination operations in the same or in subsequent vessels. Either static or fluidized beds may be used.

Although the foregoing detailed exposition of our process has been described for the case of silicon carbide raw material, these principles may be applied to any metal or metalloid carbide or carbonitride whose chloride is volatile at the temperatures employed, by changes in accordance with the specific characteristics of the metal or metalloid in question which will be apparent to those skilled in the art, as for example changes in the temperature at which the chlorination may be carried out for metals or metalloids of differing reactivity.

Although the disclosed processes produce excellent mineral active carbon suitable for a great variety of uses, known processes of adding trace metals to the finished active carbon, as for example silver, copper, or manganese, may advantageously be applied to mineral active carbon for applications where these additions are known in the art to be desirable, such as for carbons to be used in gas mask cannisters.

Various finishing operations, such as pulverizing or pelletizing to bring the mineral active carbon to a state of subdivision suitable for specific end-use circumstances, may advantageously be employed. Pelletizing, with or without a binder, may be carried out by any of the processes known to the art, some of which employ a heating operation to carbonize the binder.

The number of end use applications for which active carbon is employed is very large and somewhat different properties are required in different active carbons for different purposes. The invention embraces not a single mineral active carbon product but a range of carbons of varying properties obtained by combining in any suitable way the novel inventive processes disclosed herein with or without the conventional processes of upgrading chars which are known to the art.

The following examples illustrate various ways of carrying out the processes of the invention and illustrate the properties of the novel mineral active carbon products produced thereby; these examples are solely for purposes of illustration and are not intended to limit in any way the broad scope of our invention:

EXAMPLE NO. 1

About 23 grams of abrasive grade 16 grit green silicon carbide (nominally 99.5% SiC) were placed in a porcelain boat in a silica tube heated externally with silicon-carbide-type electric resistance heaters and chlorine was passed through the tube at a rate of about 0.5 gram per minute for 520 minutes while maintaining a temperature of 950° C. The product was cooled and dechlorinated in a stream of dry, oxygen-free nitrogen. The resulting carbon product contained 44.6% ash which was largely unreacted silicon carbide, corresponding to about 80% completion of the chlorination reaction. In an adsorption tube supplied with chlorine gas 2.265 grams of the product absorbed 0.837 gram of chlorine at 30° C., which corresponds to 0.67 gram of chlorine adsorbed per gram of carbon in the product. When 0.500 gram of the product was shaken with an aqueous iodine-potassium iodide solution for forty minutes it adsorbed 0.356 gram of iodine.

EXAMPLE NO. 2

172.5 grams of abrasive grade 30 grit green silicon carbide (nominally 99.5% SiC) were placed in a one inch diameter mullite tube provided with an external electric heater and chlorine was passed through the tube at a rate of 10 to 12 grams per minute while maintaining a nominal temperature of 1000° C. Actual temperature was in excess of 900° C. for eleven and three quarters hours of which four hours was in excess of 1050° C.; the maximum temperature reached was 1175° C. The contents of the tube were cooled to below 200° C. under a stream of nitrogen. The product was removed and held at 100° C. in the laboratory oven over the weekend. The product contained 27.2% ash, mostly unreacted silicon carbide, which corresponds to 90% completion of the chlorination reaction. At 30° C. the product adsorbed 0.437 gram of chlorine per gram of product which is about 0.60 gram of chlorine per gram of contained mineral active carbon. A sample of the product ground through 100 mesh adsorbed, from an aqueous iodine-potassium iodide solution, 0.57 gram of iodine per gram of product. When 0.50 gram of the minus 100 mesh product was shaken for 60 minutes with 75 ml. of aqueous solution containing 50 milligrams of methylene blue, 51% of the methylene blue was adsorbed by the mineral active carbon; that is, 0.051 gram of methylene blue was adsorbed per gram of product.

EXAMPLE NO. 3

100 grams of abrasive grade 16 grit black silicon carbide (nominally 99% SiC) were placed in a one inch diameter mullite tube provided with an external electric heater and chlorine was passed through the tube at a rate of 9.5 to 11 grams per minute while maintaining a nominal temperature of 1050° C. Actual temperature was in excess of 800° C. for periods of time totaling forty hours of which thirty-one hours were in the 1000° C. to 1100° C. range; temperature occasionally rose above 1100° C. for a few minutes due to hot spots, the maximum temperature recorded during the chlorination being 1160° C. Heating and cooling periods due to three interruptions in the operation account for the time at temperatures below 1000° C. The silicon tetrachloride produced in the reaction was determined by passing the gases emerging from the tube into water whereby the silicon tetrachloride was converted to silicic acid. Essentially all of the aluminum chloride and iron chloride, which sublimed out of the reaction mass, condensed in the tubing and were thereby separated from the silicon tetrachloride. 136 grams of silica was recovered by evaporating the aqueous silicic acid and dehydrating at 1400° C.; this corresponds to 385 grams of silicon tetrachloride which is 91% of theoretical. After cooling in an atmosphere of chlorine the carbon residue left in the mullite tube was dechlorinated by heating in a laboratory oven for 8 hours at 120° C. The weight of carbon recovered was 27.5 grams which is 92% of theoretical. This carbon contained 1.3% ash which showed no visible traces of unreacted silicon carbide; this mineral active carbon adsorbed from an aqueous iodine-potassium iodide solution 0.84 gram of iodine per gram of contained carbon. Under the same test conditions a commercial sample of decolorizing carbon (Norit FPQ) adsorbed 0.75 gram of iodine per gram of sample. This mineral active carbon adsorbed 0.63 gram of chlorine per gram of contained carbon.

EXAMPLE NO. 4

*Green Silicon Carbide, Cooled in Nitrogen, Low Ash, Good Adsorption*

About 23 grams of abrasive grade 30 grit green silicon carbide (nominally 99.5% SiC) were placed in a porcelain boat in a one inch diameter silica tube provided with an external electric heater and chlorine was passed through the tube at a rate of about 0.465 gram per minute, while maintaining a temperature of 1000° C. at a thermocouple in a Vycor protection tube in the gas stream just above the boat, for a total of 635 minutes. Oxygen-free, thoroughly-dried nitrogen was used to sweep out the tube (a) before the chlorination while the tube was being raised to temperature, and (b) after the chlorination while the tube was cooling to below 500° C. The silicon tetrachloride produced was condensed in a tube cooled in ice. The resulting mineral active carbon contained 0.08% ash. Upon pumping under vacuum for 30 minutes at 150° C. the mineral active carbon lost 6% in weight and then was able to adsorb 0.636 gram of chlorine per gram of carbon at 30° C. This sample of mineral active carbon adsorbed 0.831 gram of iodine per gram of carbon from aqueous iodine-potassium iodide solution; it adsorbed 0.038 gram of methylene blue per gram of unground carbon.

EXAMPLE NO. 5

[For photomicrographs at 330× showing laminated structure, i.e. FIG. 5]

100 grams of abrasive grade 16 grit black silicon carbide (nominally 99% SiC) were chlorinated, using chlorine which had been dried by bubbling through sulphuric acid, with a flow rate of about 10 grams of chlorine per minute while maintaining a nominal temperature of 1050° C. Actual temperature was in excess of 800° C. for twelve hours and was in the range 1000° C. to 1125° C. for all but about 45 minutes of this time. The reaction mass was cooled in an atmosphere of chlorine. A further 100 grams was chlorinated similarly: actual temperature was in excess of 800° C. for eleven and three quarter hours and was in the range 1000° C. to 1125° C. for ten hours with one period of twenty minutes during which temperature varied from 1150° C. to 1170° C. This reaction mass was also cooled in a chlorine atmosphere. The two reaction masses were combined and the chlorination was continued using a flow rate of dried chlorine in excess of 12 grams per minute: actual temperature was in excess of 800° C. for twelve and a half hours and was in the range 1000° C. to 1125° C. for eleven hours. The reaction mass was dechlorinated by heating in the laboratory oven at 110–120° C. A photomicrograph of the resulting mineral active carbon product at 330× magnification is reproduced here as FIG. 5.

EXAMPLE NO. 6

[For electron photomicrograph at 37,350× magnification showing lamellar structure, i.e. FIGS. 6 and 7]

100 grams of abrasive grade 16 grit black silicon carbide (nominally 99% SiC) were placed in a 1" diameter mullite tube provided with an external electric heater and chlorine was passed through the tube at a rate of 10–11 grams per minute while maintaining a nominal temperature of 800° C. Temperature was in the range 760°–840° C. for a total of one hundred and thirty-six hours during which time the reaction mass was stirred from time to time. After cooling in an atmosphere of chlorine the carbon was dechlorinated by heating overnight in the laboratory oven at 120° C. The resulting mineral active carbon contained 3.2% ash. A finely ground sample of the mineral active carbon under the electron microscope at 37,350× magnification is shown here as FIGS. 6 and 7. FIG. 6 shows the shingle-like appearance of the typical lamellar structure when viewed on the flat, and FIG. 7 shows a typical edge view of this lamellar structure.

EXAMPLE NO. 7

[Summarized in Table I]

100 grams of abrasive grade 16 grit black silicon carbide (nominally 99% SiC) were placed in a one inch diameter mullite tube provided with an external electric heater and chlorine was passed through the tube at a rate of 10 to 12 grams per minute while maintaining a nominal temperature of 1050° C. Actual temperature was in excess of 800° C. for periods of time totalling fourteen and one half hours of which ten and one half hours were in the 1000° C. to 1150° C. range. A further 100 grams were chlorinated similarly: actual temperature was in excess of 800° C. for nine and a half hours of which eight hours were in the range 1000° C. to 1150° C. A third lot of 100 grams were chlorinated similarly: actual temperature was in excess of 800° C. for ten hours of which eight hours were in the range 1000° C. to 1150° C. The second and third lots and part of the first lot were then combined and the chlorination was continued in a 1.5 inch diameter mullite tube: actual temperature was in excess of 800° C. for twenty-three hours of which eighteen and a half hours were in the range 1000° C. to 1150° C. After cooling in an atmosphere of chlorine the carbon was dechlorinated by heating overnight in the laboratory oven at 120° C. The resulting mineral active carbon contained 2.3% ash in which no unreacted silicon carbide was visible; the ash was white, indicating the absence of iron impurities.

Part of this mineral active carbon was crushed and screened through 150 mesh, part was ground and screened through 325 mesh and part was left in its original form. These samples were tested as follows, the results being summarized in Table I:

*Ash*

About 0.2 gram of the 150 mesh mineral active carbon was heated in a porcelain crucible over a Meker burner until ashing was complete; the ash was found to be 2.5% of the original sample weight.

*Electrical Resistivity*

About 3 grams of the 150 mesh mineral active carbon was placed in a ceramic cylinder, 6.4 cm. long and 3.4 cm. inside diameter, which was fitted with copper plungers. A pressure of 2000 p.s.i. was exerted on the carbon by compressing the plungers between the insulated platens of a laboratory press. The linear dimension of the carbon column was obtained by a micrometer and the resistance was measured by an ohmmeter connected to the copper plungers. From the observed values the electrical resistivity of the carbon under 2000 p.s.i. pressure was calculated to be 0.044 ohm-cms.

*Gas Adsorption Capacity—Chlorine*

About 0.2 gram of the 150 mesh mineral active carbon, dried 2 hours at 110° C., was weighed into a 9 mm. x 100 mm. Pyrex glass tube, in which it was supported on glass wool, and chlorine gas was passed through the sample at 100 milliliters per minute flow rate until the heat of adsorption had dissipated and the tube reached constant weight. The weight of chlorine adsorbed, after correcting the final weighing for the weight of the chlorine atmosphere in the tube, was 0.580 gram per gram of sample.

*Vapor Adsorption Capacity—Acetone, Benzene, m-Xylene, Water*

About 0.2 gram of the 150 mesh mineral active carbon, dried 2 hours at 110° C., was placed in the 9 x 100 mm. adsorption tube. Air was bubbled through the test liquid (acetone, benzene, m-xylene, or water) at room temperature at 100 milliliters per minute rate and then through the carbon sample at room temperature until a constant weight was attained, except that in the case of water the test was aritrarily terminated after two hours. The weights of the various vapors adsorbed were

|  | Gram per gram of sample |
|---|---|
| Acetone | 0.321 at saturation. |
| Benzene | 0.403 at saturation. |
| m-Xylene | 0.377 at saturation. |
| Water | 0.169 after two hours. |

*Heat of Wetting—Acetone, Benzene, m-Xylene, Water*

A glass tube 30 mm. x 180 mm., fitted with a Nichrome wire manual stirrer, was suspended in a glass jacket which was surrounded by water at 25° C. within a Dewar flask. Twenty milliliters of the test liquid was pipetted into the glass tube and a sample container with a weighed sample of 150 mesh carbon was supported at the lip of the glass tube. The bulb of a Beckman thermometer was immersed in the test liquid and readings were taken to the nearest 0.001° C. When the temperature of the calorimeter became constant, the weighed carbon sample was added rapidly to the test liquid, stirred, and the resulting temperature change was recorded. The measured heats of wetting were:

|  | Calories per gram of sample |
|---|---|
| In acetone | 11.1 |
| In benzene | 10.6 |
| In m-xylene | 10.8 |
| In water | 6.5 |

*Adsorption From Aqueous Solution—Iodine*

About 0.2 gram of 325 mesh carbon was weighed into a 250 ml. conical flask and 10 ml. of 0.7 molar HCl was added. The mixture was heated to boiling and cooled; then 40 ml. of N/10 iodine solution was added. The flask was shaken mechanically for forty minutes, the carbon was allowed to settle, a 10 ml. aliquot was withdrawn by pipette and titrated with N/10 sodium thiosulphate solution. The iodine which had disappeared from solution by adsorption on the carbon was found by calculation to be 1.230 grams per gram of sample.

*Adsorption From Aqueous Solution—Phenol*

50 milligrams of the 325 mesh carbon were weighed into a 250 ml. conical flask and 100 ml. of 1.00 gram per liter phenol solution were added by pipette. The flask was shaken mechanically for one hour, the carbon was allowed to settle, and a 20 ml. aliquot was transferred to a second flask followed by 20 ml. of N/10 potassium bromate solution containing 8.7 grams per liter of sodium bromide and by 5 ml. of concentrated hydrochloric acid. After the precipitate of tribromophenol had formed, 10 ml. of 5% potassium iodide solution was added. The liberated iodine was titrated with N/10 sodium thiosulphate and the amount of phenol which had disappeared from solution by adsorption on the carbon was found by calculation to be 0.344 gram per gram of carbon.

*Adsorption From Aqueous Solution—Methylene Blue*

A 0.200 gram sample of 325 mesh carbon was placed in a 250 ml. conical flask and 80 ml. of aqueous methylene blue solution containing 1.000 gram of methylene blue per liter was pipetted into the flask. It was shaken mechanically for one hour, the carbon allowed to settle and a 1 ml. aliquot was pipetted into a 20 mm. test tube where 20 ml. of water was added. Concentration of this dilute of methylene blue was determined by visual comparison with similar sealed tubes of known methylene blue concentration. The methylene blue which had disappeared from solution by adsorption on the carbon was found to be 0.336 gram per gram of sample.

*Hydrogen*

The sample of uncrushed carbon was dried at 200° C. and then burned with oxygen in a combustion train while collecting the water, formed by combustion of any contained hydrogen, in an absorption tower. It was found that the mineral active carbon contained 0.00% hydrogen; that is, no hydrogen was present as part of the mineral active carbon, as distinguished from adsorbed water which, of course, contains hydrogen.

*pH*

Approximately 0.2 gram of 325 mesh carbon was added to 5 ml. of distilled water, heated to boiling, then cooled to room temperature. The pH of the solution was determined using a Beckman pH meter and found to be be 2.4.

*X-Ray Diffraction*

A sample of the 325 mesh mineral active carbon was examined by X-ray diffraction using the $K_a$ radiation from a copper target. The X-ray tube current was 20 milliamperes and voltage was 30 kv. The spectrum was scanned at a rate of 1° per minute through a scanning angle ($2\theta$) range of at least 10° to 90° with a full scale counting rate of 240 counts per second. The (002) line was weak and diffuse, corresponding to about two aromatic planes only in the crystallites. The (10) line was diffuse and just perceptible. There was no trace of a (11) line. In general the aromatic crystalline pattern was much weaker than for a hard coke heat treated at 1400° C.

*Electron Photomicrograph*

A finely ground sample of the mineral active carbon, when examined under the electron microscope at magnifications of 37,350× and 82,250×, showed a well developed lamellar structure.

Optical Photomicrograph

An unground sample of the granular mineral active carbon under an ordinary microscope at 330× magnification showed a laminated structure.

Magnetic Resonance

A sample of the mineral active carbon was tested for paramagnetic electron spin resonance using a spectrometer capable of detecting absorption lines less than 100 gauss in width and of an intensity greater than $10^{17}$ free spins per gram. The sample was first examined in air, then under vacuum. It was heated to 450° C. under vacuum, cooled to room temperature and again examined under vacuum; it was similarly heat treated at 1200° C., 1400° C. and 1600° C. and examined under vacuum at room temperature. A very small magnetic resonance line was detectable at 1600° C. but no lines were observed below this heat treatment temperature.

EXAMPLE NO. 8

[Summarized in Table I]

100 grams of abrasive grade 16 grit black silicon carbide (nominally 99% SiC) were placed in one inch diameter mullite tube provided with an external electric heater and chlorine was passed through the tube at a rate of 10 to 12 grams per minute while maintaining a nominal temperature of 1200° C. Actual temperature was in excess of 800° C. for periods of time totalling twelve and three-quarter hours of which ten and three-quarter hours were in the range 1150° C. to 1250° C. Only once did the temperature exceed 1250° C. during the run when 1280° C. was recorded briefly. After cooling in an atmosphere of chlorine the carbon was dechlorinated by heating overnight in the laboratory oven at 120° C.

Part of this mineral active carbon was crushed and screened through 150 mesh, part was ground and screened through 325 mesh, and part was left in its original form. These samples were tested as described for Example 7; the values obtained are shown in Table I.

A sample of the 325 mesh mineral active carbon was examined by X-ray diffraction as described for Example 7; the aromatic crystalline pattern was essentially identical with that obtained for Example 7, being much weaker than for a hard coke heat treated at 1400° C.

A finely ground sample of the mineral active carbon when examined under the electron microscope at magnification of 37,500× and 82,250×, showed a well developed lamellar structure.

An unground sample of the granular mineral active carbon under an ordinary microscope at 330× magnification showed a laminated structure.

EXAMPLE NO. 9

[Summarized in Table I]

250 grams of abrasive grade 16 grit black silicon carbide (nominally 99% SiC) were placed in a 1.5 inch diameter mullite tube provided with an external electric heater and chlorine was passed through the tube at a rate of 10 to 11 grams per minute. Twenty minutes after the temperature had first reached 800° C. a temperature in excess of 1300° C. was noted, then both the thermocouple and the electric heater failed. It was subsequently found that the mullite reaction tube and the mullite thermocouple protection tube had melted (M.P. about 1650° C.). The chlorine flow was maintained and reaction continued at white heat for some time, gradually subsiding till the red glow disappeared, after which the temperature fell rapidly. The product, which was fairly well carbonized, was placed in a new tube and chlorinated at 950–1050° C. for three and a half hours. It was then decided to terminate the chlorination so that the carbon would be substantially all formed at approximately 1650° C. It was cooled in chlorine and dechlorinated by heating in the laboratory oven over-night at about 110° C. The product contained 28.9% ash, most of which was unreacted silicon carbide.

Part of this mineral active carbon was crushed and screened through 150 mesh, part was ground and screened through 325 mesh, and part was left in its original form. These samples were tested as described for Example 7 and the observed values were then adjusted to a contained carbon basis using the ash determination on the 150 mesh material; the values obtained are shown in Table I. Because of the contained silicon carbide, electrical resistivity of this sample has no significance.

A sample of the 325 mesh mineral active carbon was examined by X-ray diffraction as described for Example 7; the aromatic crystalline pattern showed a weak but well defined (002) line, a just perceptible, diffuse (10) line, but no (11) line; this pattern was similar to that for a hard coke at 1400° C. except that the (10) line of the mineral active carbon was noticeably weaker.

A finely ground sample of the mineral active carbon, when examined under the electron microscope at a magnification of 37,350× showed a well developed lamellar structure.

EXAMPLE NO. 10

[Summarized in Table I]

70 grit abrasive grade black silicon carbide (nominally 99% SiC) was placed in a 17 mm. diameter Vycor tube provided with an external electric heater. The tube was flushed with chlorine at room temperature for 15 minutes then raised to 1050° C. for 24 hours while continuing the chlorine flow. The chlorine flow was stopped and the reaction product was purged and dechlorinated by eight cycles of cooling to room temperature and re-heating to 1050° C. while maintaining a slow flow of nitrogen through the Vycor tube. The chlorine and the nitrogen used in this example were dried by bubbling through concentrated sulfuric acid.

Part of the resulting mineral active carbon was crushed and screened through 150 mesh, part was ground and screened through 325 mesh, and part was left in its original form. These samples were tested as described for Example 7; the values obtained are shown in Table I.

A sample of the 325 mesh mineral active carbon was examined by X-ray diffraction as described for Example 7; the (002) line was barely perceptible but the (10) and (11) lines were absent.

A finely ground sample of the mineral active carbon, when examined under the electron microscope at a magnification of 37,350×, showed a well developed lamellar structure.

An underground sample of the granular mineral active carbon under an ordinary microscope at 330× magnification showed a laminated structure.

EXAMPLE NO. 11

[Summarized in Table I]

70 grit abrasive grade green silicon carbide (nominally 99.5% SiC) was placed in a 17 mm. Vycor tube provided with an external electric heater. The tube was flushed with chlorine at room temperature for 15 minutes then raised to 825° C. for 630 hours while continuing the chlorine flow. During the early part of the run hot spots were controlled by diluting the chlorine feed with nitrogen as well as by decreasing the heat supplied by the external electric heaters. The chlorine flow was stopped and the reaction product was purged and dechlorinated by eight cycles of cooling to room temperature and reheating to 825° C. while maintaining a slow flow of nitrogen through the Vycor tube. The chlorine and the nitrogen used in this example were dried by bubbling through concentrated sulphuric acid. Part of the resulting mineral active carbon was crushed and screened through 150 mesh, part was ground and screened through 325 mesh, and part was left in its original form. These samples were tested as described for Example 7 except that the sample was dried at 300° C. before the hydrogen determination; the values obtained are shown in Table I. A sample of the carbon withdrawn from the reaction tube after cooling in nitrogen but before the cyclic purging operation had a pH value of 2.4.

A sample of the 325 mesh mineral active carbon was examined by X-ray diffraction as described for Example 7; the (002) line was barely perceptible but the (10) and (11) lines were absent.

A finely ground sample of the mineral active carbon, when examined under the electron microscope at magnifications of 37,500× and 82,250×, showed a well developed lamellar structure.

An unground sample of the granular mineral active carbon under an ordinary microscope at 330× magnification showed a laminated structure.

A sample of the mineral active carbon was tested for paramagnetic electron spin resonance using a spectrometer capable of detecting absorption lines less than 100 gauss in width and of an intensity greater than $10^{17}$ free spins per gram. The sample was examined first in air, then under vacuum. It was heated to 450° C. under vacuum, cooled to room temperature and again examined under vacuum; it was similarly heat treated at 750° C., 900° C., 1070° C., 1200° C., 1400° C. and 1600° C., and examined under vacuum at room temperature. In none of these cases was any electron spin resonance absorption detectable.

EXAMPLE NO. 12

110 grams of abrasive grade 8 grit black silicon carbide (nominally 99% SiC) were placed in a one inch diameter mullite tube provided with an external electric heater and chlorine was passed through the tube at a rate of 10 to 12 grams per minute while maintaining a nominal temperature of 1050° C. Actual temperature was in excess of 800° C. for thirty-seven hours of which thirty-one hours was in the range 1000° C.–1120° C. After cooling in an atmosphere of chlorine the carbon was dechlorinated by heating over-night in the laboratory oven at 120° C. The resulting mineral active carbon contained 0.4% ash.

EXAMPLE NO. 13

About 25 grams of abrasive grade 240 grit green silicon carbide (nominally 99.5% SiC) were placed in a porcelain boat in a one inch diameter silica tube provided with an external electric heater and chlorine was passed through the tube at a rate of about 0.465 gram per minute, while maintaining a temperature of 900° C. at a thermocouple in a Vycor protection tube in the gas stream just above the boat, for a total of 325 minutes. Oxygen-free, thoroughly dried nitrogen was used to sweep out the tube (a) before the chlorination while the tube was being raised to temperature, and (b) after the chlorination while the tube was cooling to below 500° C. The silicon tetrachloride produced was condensed in a tube cooled in ice. The resulting mineral active carbon contained 6.2% ash. Upon pumping under vacuum for 30 minutes at 150° C. the mineral active carbon lost 6.7% in weight and then was able to adsorb 0.635 gram of chlorine per gram of sample at 30° C. This sample of mineral active carbon adsorbed 0.913 gram of iodine per gram of sample from aqueous iodine-potassium iodide solution. Half a gram of this sample adsorbed 99.93% of the methylene blue from an aqueous solution containing 0.050 gram of methylene blue in 75 ml. of water when they were shaken together for 60 minutes.

EXAMPLE NO. 14

*Preparation of Mineral Active Carbon for Use in Dechlorination Examples Nos. 16 to 18 and 24*

100 grams of abrasive grade 16 grit black silicon carbide (nominally 99% SiC) were placed in a one inch mullite tube provided with an external electric heater and chlorine was passed through the tube at a rate of 10 to 12 grams per minute while maintaining a nominal temperature of 1050° C. Actual temperature was in excess of 800° C. for periods of time totalling forty-seven hours of which forty-five hours were in the 1000° C. to 1150° C. range; the reaction once ran away reaching a temperature of 1350° C. but was immediately brought under control by introducing nitrogen into the system, the total time at temperatures in excess of 1180° C. being less than three minutes. The product was cooled to room temperature in an atmosphere of chlorine. A sample of the product, after dechlorination, showed 2.5% ash.

EXAMPLE NO. 15

*Preparation of Active Carbon for Use in Dechlorination Examples Nos. 19 to 23 and 25 to 37*

100 grams of abrasive grade 16 grit black silicon carbide (nominally 99% SiC) were placed in a one inch mullite tube provided with an external electric heater and chlorine was passed through the tube at a rate of 14 to 15 grams per minute while maintaining a nominal temperature of 1050° C. Actual temperature was in excess of 800° C. for seventeen hours of which fifteen hours were in the 1000° C. to 1150° C. range. The product was cooled to room temperature in an atmosphere of chlorine. A sample of the product was dichlorinated at 120° C. for an ash determination which showed 3.4% ash.

EXAMPLE NO. 16

*Static Dechlorination*

A sample of mineral active carbon from Example 14, containing 0.326 gram of chlorine per gram of carbon was placed in a sample tube open at one end only and heated at 210° C. without any flow of gas through the sample until the sample was completely dechlorinated. Grams of chlorine still adsorbed on 0.2523 gram of carbon after various heating intervals were as follows.

| Time of dechlorination at 210° C.: | Chlorine still adsorbed, grams |
|---|---|
| Initial | 0.0824 |
| 15 minutes | 0.0070 |
| 30 minutes | 0.0006 |
| 45 minutes | 0.0002 |

EXAMPLE NO. 17

*Static Dechlorination*

A sample of mineral active carbon from Example 14 containing 0.581 gram of chlorine per gram of carbon was placed in a sample tube open at one end only and heated at 250° C. without any flow of gas through the sample until the sample was completely dechlorinated. Grams of chlorine still absorbed on 0.2403 gram of carbon after various heating intervals were as follows.

| Time of dechlorination at 250° C.: | Chlorine still adsorbed, grams |
|---|---|
| Initial | 0.1396 |
| 15 minutes | 0.0129 |
| 30 minutes | 0.0049 |
| 45 minutes | 0.0012 |
| 60 minutes | 0.0003 |
| 75 minutes | 0.0001 |
| 90 minutes | 0.0000 |

EXAMPLE NO. 18

Airstream Dechlorination at 175° C.

A sample of mineral active carbon from Example 14 containing 0.635 gram of chlorine per gram of carbon was placed in a sample tube and heated at 175° C. while passing through it air, which had been dried by passing over silica gel and fused caustic soda pellets, until the sample was completely dechlorinated. Grams of chlorine still adsorbed on 0.1994 gram of carbon after various heating intervals were as follows:

| Time of dechlorination at 175° C.: | Chlorine still adsorbed, grams |
|---|---|
| Initial | 0.1069 |
| 15 minutes | 0.0034 |
| 30 minutes | 0.0018 |
| 45 minutes | 0.0012 |
| 60 minutes | 0.0008 |
| 75 minutes | 0.0004 |
| 90 minutes | 0.0002 |

EXAMPLE NO. 19

Airstream Dechlorination at Room Temperature

A sample of mineral active carbon from Example 15 containing 0.590 gram of chlorine per gram of carbon was placed in a sample tube at room temperature and air, which had been dried by passing over silica gel and fused caustic soda pellets, was passed through it until the sample was substantially dechlorinated. Grams of chlorine still adsorbed on 0.2209 gram of carbon after various intervals were as follows.

| Time of dechlorination at room temperature: | Chlorine still adsorbed, grams |
|---|---|
| Initial | 0.1303 |
| 3 hours | 0.0102 |
| 6 hours | 0.0062 |
| 9 hours | 0.0040 |
| 12 hours | 0.0023 |
| 16 hours | 0.0014 |
| 20 hours | 0.0007 |

EXAMPLE NO. 20

Airstream Dechlorination at 150° C.

A 0.2018 gram sample of undechlorinated mineral carbon from Example 15 was placed in a tube through which was passed air which had been dried by passing over silica gel and fused caustic soda pellets, and the sample was heated at 150° C. until there was no further loss in weight which was for a total of 100 minutes, and heating was continued for a further 30 minutes. The temperature was then raised to 900° C. while passing dry nitrogen through the sample and then through 5% caustic; analysis of the caustic for hypochlorite ion showed that no further chlorine had been desorbed from the mineral active carbon at 900° C. The mineral active carbon was then ashed by passing oxygen through the sample tube and absorbing the products of combustion in 5% caustic soda; no chlorine was evolved from the mineral active carbon when it was ashed. A sample of this same mineral carbon after dechlorination at 150° C. for 100 minutes had a pH value of 2.9, an iodine capacity of 2.03 grams of iodine per gram of sample, and an m-xylene capacity of 0.605 gram per gram of sample.

EXAMPLE NO. 21

Nitrogen Dechlorination at 150° C.

A 0.2989 gram sample of undechlorinated mineral carbon from Example 15 was placed in a tube through which was passed nitrogen which had been dried by bubbling through concentrated sulphuric acid, and the sample was heated at 150° C. until there was no further loss in weight, which was for a total of fifty minutes. Treatment at 900° C. and ashing, as described for Example 20, showed that no chlorine remained absorbed on the carbon. A separate sample dechlorinated 85 minutes is a nitrogen stream at 150° C. had a pH value of 2.4, an iodine capacity of 2.02 grams of iodine per gram of sample, and a m-xylene capacity of 0.583 gram per gram of sample.

EXAMPLE NO. 22

Stream Dechlorination at 150° C.

A 0.1690 gram sample of undechlorinated mineral carbon from Example 15 was placed in a tube through which was passed steam at 150° C. for fifty minutes. Treatment at 900° C. and ashing, as described for Example 20, showed that no chlorine remained adsorbed on the carbon. A separate sample dechlorinated eighty minutes with steam at 150° C. had a pH value of 3.0, an iodine capacity of 2.02 grams of iodine per gram of sample, and a m-xylene capaicty of 0.607 gram per gram of sample.

EXAMPLE NO. 23

Carbon Dioxide Dechlorination at 150° C.

A 0.1740 gram sample of undechlorinated mineral carbon from Example 15 was placed in a tube through which was passed carbon dioxide at 150° C. for fifty minutes; at the end of the first ten minutes the sample had reached constant weight. Treatment at 900° C. and ashing, as described for Example 20, showed that no chlorine remained adsorbed on the carbon. A separate sample dechlorinated thirty minutes with carbon dioxide at 150° C. had a pH value of 2.6, an iodine capacity of 0.188 gram of iodine per gram of sample, and a m-xylene capacity of 0.610 gram per gram of sample.

EXAMPLE NO. 24

Vacuum Dechlorination

About 0.2 gram samples of mineral active carbon from Example 14 were dechlorinated by evacuation at 20 mm. mercury at temperatures and for times shown in Table III; this table records the chlorine absorbed on the carbon before and after dechlorination. Dechlorination was substantially complete at 0° C. after twelve to fifteen hours; dechlorination was complete at 25° C. after five to six hours.

EXAMPLE NO. 25

Dechlorination by Water Wash

A 1.5 gram sample of undechlorinated mineral carbon from Example 15 was washed by passing through it at a rate of about 200 milliliters per minute tap water having a pH of 7.5. After two liters of water had been passed through the carbon the pH value of the carbon was 2.4; after ten liters of water had been passed through the carbon the pH value of the carbon was 6.6. The carbon was then dried at 100° C. for one and a half hours; the mineral active carbon product then had a pH value of 7.3. The mineral active carbon was then analyzed for adsorbed chlorine and for chloride as follows: A sample of the dry mineral active carbon was placed in a tube furnace and heated in a stream of nitrogen at 900° C. for fifteen minutes, the nitrogen stream being bubbled through 5% caustic soda. Analysis of the caustic solution for hypochlorite showed that no adsorbed chlorine had remained on the mineral active carbon after washing and drying; this analysis showed only a trace of volatile chlorides removed from the mineral active carbon at 900° C. amounting to less than 0.01% of the carbon by weight when expressed as chloride ion. The sample of mineral active carbon was then ashed by passing air through the tube at 900° C., the off gas being bubbled through 5% caustic soda as before. Analysis of the caustic solution showed that no free chlorine was liberated by ashing and less than 0.01% chloride. The ash residue amounted to 2.9% of the mineral active carbon; analysis of this ash showed no free chlorine and less than 0.001% chloride expressed as percent of the mineral active carbon sample. The iodine adsorption capacity of the mineral active carbon was found to be 1.339 grams of iodine per gram of sample; the m-xylene capacity was 0.567 gram per gram of sample. These results are summarized in Table II.

EXAMPLE NO. 26

*Dechlorination With 5% Caustic Soda*

A 1.5 gram sample of undechlorinated mineral carbon from Example 15 was mixed with 20 milliliters of 5% sodium hydroxide solution and heated to boiling. The carbon was then washed by passing tap water through it at a rate of about 200 milliliters per minute; after six liters of water had been passed through the carbon the pH value of the carbon was 8.0. The carbon was then dried at 100° C. for one and a half hours; the mineral active carbon product then had a pH value of 8.4. Analysis of the mineral active carbon product for adsorbed chlorine and for chlorides was carried out as described for Example 25 with results as shown in Table II. The iodine and m-xylene adsorption capacities of the mineral active carbon were found to be as reported in Table II.

EXAMPLE NO. 27

*Dechlorination With 5% Aqueous Ammonia*

About 1.35 grams of undechlorinated mineral carbon from Example 15 was mixed with 20 milliliters of 5% aqueous ammonia and heated. The carbon was then washed by passing tap water through it at a rate of about 200 milliliters per minute; after three liters of water had been passed through the carbon the pH value of the carbon was 7.8. The carbon was then dried at 100° C. for one and a half hours; the mineral active carbon product then had a pH value of 8.1. Analysis of the mineral active carbon product for adsorbed chlorine and for chlorides was carried out as described for Example 25 with results as shown in Table II. The iodine and m-xylene adsorption capacities of the mineral active carbon were found to be as reported in Table II.

EXAMPLE NO. 28

*Declorination With 5% Caustic Soda Followed by HCl*

A 1.5 gram sample of undechlorinated mineral carbon from Example 15 was mixed with 20 milliliters of 5% caustic soda solution and heated to boiling. Then 40 milliliters of 5% hydrochloric acid was added and it was again heated to boiling. The carbon was then washed by passing tap water through it at a rate of about 200 milliliters per minute; after ten liters of water had been passed through the carbon the pH value of the carbon was 7.6. The carbon was then dried at 100° C. for one and a half hours; the mineral active carbon product then had a pH value of 7.3. Analysis of the mineral active carbon product for adsorbed chlorine and for chlorides was carried out as described for Example 25 with results as shown in Table II. The iodine and m-xylene adsorption capacities of the mineral active carbon were found to be as reported in Table II.

EXAMPLE NO. 29

*Dechlorination With 5% Ammonia Followed by HCl*

About 1.5 grams of undechlorinated mineral carbon from Example 15 was mixed with 20 milliliters of 5% aqueous ammonia and heated to boiling. Then 40 milliliters of 5% hydrochloric acid was added and it was again heated to boiling. The carbon was then washed by passing tap water through it at a rate of about 200 milliliters per minute; after eleven liters of water had been passed through the carbon the pH value of the carbon was 7.5. The carbon was then dried at 100° C. for one and a half hours; the mineral active carbon product then had a pH value of 7.3. Analysis of the mineral active carbon product for adsorbed chlorine and for chlorides was carried out as described for Example 25 with results as shown in Table II. The iodine and m-xylene adsorption capacities of the mineral active carbon were found to be as reported in Table II.

EXAMPLE NO. 30

*Dechlorination With 5% Sodium Bisulphite*

About 1.5 grams of undechlorinated mineral carbon from Example 15 was mixed with 20 milliliters of 5% aqueous sodium bisulphite and heated to boiling. The carbon was then washed by passing tap water through it at a rate of about 200 milliliters per minute; after nine liters of water had been passed through the carbon the pH value of the carbon was 7.2. The carbon was then dried at 100° C. for one hour; the mineral active carbon product then had a pH value of 8.2. Analysis of the mineral active carbon product for adsorbed chlorine and for chlorides was carried out as described for Example 25 with results as shown in Table II. The iodine and m-xylene adsorption capacities of the mineral active carbon were found to be as reported in Table II.

EXAMPLE NO. 31

*Dechlorination With 5% Sodium Hyposulphite—$Na_2S_2O_4$*

About 1.5 grams of undechlorinated mineral carbon from Example 15 was mixed with 20 milliliters of 5% aqueous sodium hyposulphite ($Na_2S_2O_4$). The carbon was then washed by passing tap water through it at a rate of about 200 milliliters per minute; after eight liters of water had been passed through the carbon the pH value of the carbon was 7.3. The carbon was then dried at 100° C. for one hour; the mineral active carbon product then had a pH value of 2.5. Analysis of the mineral active carbon product for adsorbed chlorine and for chlorides was carried out as described for Example 25 with results as shown in Table II. The iodine and m-xylene adsorption capacities of the mineral active carbon were found to be as reported in Table II.

EXAMPLE NO. 32

*Dechlorination With 5% Sodium Thiosulphate—$Na_2S_2O_3$*

About 1.0 gram of undechlorinated mineral carbon from Example 15 was mixed with 20 milliliters of 5% aqueous sodium thiosulphate ($Na_2S_2O_3$). The carbon was then washed by passing tap water through it at a rate of about 200 milliliters per minute; after nineteen liters of water had been passed through the carbon the pH value of the carbon was 7.0. The carbon was then dried at 100° C. for one hour; the mineral active carbon product then had a pH value of 2.4. Analysis of the mineral active carbon product for adsorbed chlorine and for chloride was carried out as described for Example 25 with results as shown in Table II. The iodine and m-xylene adsorption capacities of the mineral active carbon were found to be as reported in Table II.

EXAMPLE NO. 33

*Dechlorination With 5% Hydrogen Peroxide*

About 1.0 gram of undechlorinated mineral active carbon from Example 15 was mixed with 20 milliliters of 5% hydrogen peroxide solution. The carbon was then washed by passing tap water through it at a rate of about 200 milliliters per minute; after five liters of water had been passed through the carbon the pH value of the carbon was 7.5. The carbon was then dried at 100° C. for one hour; the mineral active carbon then had a pH value of 7.3. Analysis of the mineral active carbon product for adsorbed chlorine and for chloride was carried out as described for Example 25 with results as shown in Table II. The iodine and m-xylene adsorption capacities of the mineral active carbon were found to be as reported in Table II.

EXAMPLE NO. 34

*Dechlorination With 5% Sodium Carbonate*

About 1.0 gram of undechlorinated mineral active carbon from Example 15 was mixed with 20 milliliters of 5% sodium carbonate solution. The carbon was then washed by passing tap water through it at a rate of about 200 milliliters per minute; after one liter of water had been passed through the carbon the pH value of the carbon was 7.6. The carbon was then dried at 100° C. for one hour; the mineral active carbon then had a pH value of 7.8. An analysis of the mineral active carbon product for adsorbed chlorine and for chloride was carried out as described for Example 25 with results as shown in Table II. The iodine and m-xylene adsorption capacities of the mineral active carbon were found to be as reported in Table II.

EXAMPLE NO. 35

*Dechlorination With 5% Sodium Bicarbonate*

About 1.0 gram of undechlorinated mineral active carbon from Example 15 was mixed with 20 milliliters of 5% sodium bicarbonate solution. The carbon was then washed by passing tap water through it; after ten liters of water had been passed through the carbon the pH value of the carbon was 7.3. The carbon was then dried at 100° C. for one hour; the mineral active carbon then had a pH value of 7.7. An analysis of the mineral active carbon product for adsorbed chlorine and for chloride was carried out as described for Example 25 with results as shown in Table II. The iodine and m-xylene adsorption capacities of the mineral active carbon were found to be as reported in Table II.

EXAMPLE NO. 36

*Dechlorination With 5% Hydrochloric Acid*

About 1.0 gram of undechlorinated mineral active carbon from Example 15 was mixed with 20 milliliters of 5% hydrochloric acid. The carbon was then washed by passing tap water through it; after twenty-one liters of water had been passed through the carbon the pH value of the carbon was 7.3. The carbon was then dried at 100° C. for one hour; the mineral active carbon then had a pH value of 7.8. An analysis of the mineral active carbon product for adsorbed chlorine and for chloride was carried out as described for Example 25 with results as shown in Table II. The iodine and m-xylene adsorption capacities of the mineral active carbon were found to be as reported in Table II.

EXAMPLE NO. 37

*Removal of Chlorides From Carbon by Gas Stream at Elevated Temperatures*

(37A) Analysis of the carbon of Example 20 (derived from Example 15), after dechlorination in an airstream for 130 minutes at 150° C., showed no adsorbed chlorine but showed 3.34% chloride.

(37B) A sample of the same carbon from Example 15 after dechlorination in an airstream for 100 minutes at 150° C. had a pH of 2.9 and a m-xylene capacity of 0.605 gram per gram.

(37C) Analysis of a sample of the carbon from Example 15 after dechlorination in a nitrogen stream for 80 minutes at 150° C. showed no adsorbed chlorine but showed 4.15% chloride.

(37D) A further sample from Example 15, as disclosed under Example 21, after dechlorination in a nitrogen stream for 85 minutes at 150° C. had a pH of 2.4 and a m-xylene capacity of 0.583 gram per gram.

(37E) A sample of the carbon from Example 15 was dechlorinated in an airstream for 100 minutes at 350° C. and showed 2.55% chloride. As compared to sample 37A this was a reduction of 0.79% in the chloride content by raising the temperature from 150° C. to 350° C. Sample 37E was further heated in a stream of nitrogen at 900° C. for 30 minutes after which it was found to have a chloride content of only 0.97%. A further sample (37F) from Example 15 after dechlorination in an airstream for 110 minutes at 350° C. had a pH of 3.7, an increase of 0.8 as compared to sample 37A; it had a m-xylene capacity of 0.632 gram per gram.

(37G) A sample of the carbon from Example 15 was dechlorinated in a nitrogen stream for 60 minutes at 350° C. and showed 1.50% chloride. As compared to sample 37C this was a reduction of 2.65% in the chloride content by raising the temperature from 150° to 350° C. Sample 37F was further heated in a stream of nitrogen at 900° C. for 30 minutes after which it was found to have a chloride content of only 0.48%. A further sample (37H) from Example 15 after dechlorination in a nitrogen stream for 60 minutes at 350° C. had a pH of 4.6, an increase of 2.2 as compared to sample 37D.

These comparisons are summarized in Table IV.

EXAMPLE NO. 38

*Removal of Impurities and Formation of Neutral Carbon by Heating to 350° C.*

About 2 grams of the dechlorinated mineral active carbon from Example 3 was dried for two hours in the laboratory oven at 100° C. to remove moisture adsorbed from the air since it was prepared; the loss in weight was 2.8%. This dried mineral active carbon had a pH of 3.1. About 1 gram of this dried carbon was placed in a porcelain boat and heated in a tube furnace at 350° C. for two hours without flow through the tube; loss in weight was 5.2%. The resulting carbon had a pH of 7.2.

EXAMPLE NO. 39

*Mineral Active Carbon From Metallurgical Grade Silicon Carbide*

120 grams of metallurgical grade 14 mesh and finer silicon carbide (norminally 90% SiC) were placed in a one inch diameter mullite tube provided with an external electric heater and chlorine was passed through the tube at a rate of 8.7 grams per minute while maintaining a nominal temperature of 1050° C. Actual temperature was in excess of 800° C. for twenty-three hours of which nineteen hours was in the range 1000° C.–1100° C. After cooling in an atmosphere of chlorine the carbon was dechlorinated by heating overnight in the laboratory oven at 120° C. The resulting mineral active carbon contained 36.6% ash. It had the following adsorption capacities:

|   | Grams per gram of product |
|---|---|
| Acetone | 0.140 |
| m-Xylene | 0.145 |
| Iodine | 0.980 |
| Chlorine | 0.205 |
| Methylene blue | 0.131 |

EXAMPLE NO. 40

*Mineral Active Carbon From Firesand*

A sample of firesand, which is an electric furnace by-product containing about 50% SiC, was screened to separate the on 40 mesh fraction and 100 grams of this coarse firesand were placed in a one inch diameter mullite tube provided with an external electric heater and chlorine was passed through the tube at a rate of 8.7 grams per minute while maintaining a nominal temperature of 1050° C. Actual temperature was in excess of 800° C. for thirty-six hours, of which thirty-two and a half hours were in the range 1000° C.–1100° C. After cooling in an atmosphere of chlorine the carbon was dechlorinated by heating overnight in the laboratory oven at 120° C. The resulting mineral active carbon contained 33.6% ash. It had the following adsorption capacities:

|   | Grams per gram of product |
|---|---|
| Acetone | 0.085 |
| m-Xylene | 0.095 |
| Iodine | 0.835 |
| Chlorine | 0.152 |
| Methylene blue | 0.164 |

EXAMPLE NO. 41

*Mineral Active Carbon From Titanium Carbide*

20 grams of titanium carbide (TiC) were placed in a 15 mm. Vycor tube provided with an external electric heater and chlorine was passed through the tube at a rate of about 5 grams per minute while maintaining a temperature of 800–900° C. Clouds of titanium chloride were evolved. After seventy minutes the process was stopped and the resultant carbon was cooled in an atmosphere of chlorine. It was dechlorinated at 110° C. An ash determination showed that the reaction was about 95% complete. It was chlorinated at 700–750° C. for a further 115 minutes, cooled in chlorine and dechlorinated at 115° C. overnight. The resulting mineral active carbon contained 5.25% ash, corresponding to about 99% completion of the reaction if the original carbide were pure.

The mineral active carbon product adsorbed 0.397 gram chlorine per gram of product, 0.514 gram of iodine per gram of product, or 0.192 gram of methylene blue per gram of product.

A sample of the mineral active carbon was examined by X-ray diffraction as described for Example 7; there was no trace of any aromatic crystalline pattern although a strong line due to titania impurities occurred at about the location of the (002) line; the identification of this titania line was confirmed by its shape and by the presence of other titania lines of the correct relative intensities.

A sample of the mineral active carbon was tested under vacuum for paramagnetic electron spin resonance, as described for Example No. 11, in its original condition and after heat treatment at temperatures of 250° C., 750° C. and 1050° C.; in no case was any magnetic resonance detectable.

A finely ground sample of the mineral active carbon, when examined under the optical microscope at a magnification of 37,350×, showed a well developed lamellar structure.

EXAMPLE NO. 42

*Mineral Active Carbon From Zirconium Carbide*

About 40 grams of 8/20 mesh zirconium carbide (ZrC) were placed in a 15 mm. Vycor tube provided with an external electric heater and chlorine was passed through the tube at a rate of about 5.3 grams per minute while maintaining a temperature of 620 to 730° C. for 100 minutes; zirconium chloride was evolved freely until the end of 90 minutes. The product was cooled in chlorine and dechlorinated at 115° C. overnight. The resulting mineral active carbon contained 28.8% ash, corresponding to about 95.6% completion of the reaction if the original carbide were pure.

The mineral active carbon product adsorbed 0.276 gram of chlorine per gram of product, 0.888 gram of iodine per gram of product, or 0.210 gram of methylene blue per gram of product.

EXAMPLE NO. 43

*Mineral Active Carbon From Aluminum Carbide*

About 20 grams of aluminum carbide ($Al_4C_3$) was placed in a 15 mm. Vycor tube provided with an external electric heater and chlorine was passed through the tube at a rate of about 5.3 grams per minute while maintaining a temperature of 560–680° C. for two hours; aluminum chloride was evolved freely for about thirty minutes and slower for a further forty-five minutes. The product was cooled in chlorine and dechlorinated at 115° C. overnight. The resulting mineral active carbon contained 4.2% ash, corresponding to 99% completion of the reaction if the original carbide were pure.

The mineral active carbon product adsorbed 0.398 gram of chlorine per gram of product, 0.635 gram of iodine per gram of product, or 0.258 gram of methylene blue per gram of product.

A sample of the mineral active carbon was examined by X-ray diffraction as described for Example 7; the (002) line was diffuse and barely perceptible but the (10) and (11) lines were absent.

A sample of the mineral active carbon was tested under vacuum for paramagnetic electron spin resonance, as described for Example No. 11, in its original condition and after heat treatment at temperatures of 400° C., 650° C., 750° C., 800° C., 900° C.; in no case was any magnetic resonance detectable.

A finely ground sample of the mineral active carbon, when examined under the electron microscope at magnifications of 37,350× and 87,250×, showed a well developed lamellar structure.

EXAMPLE NO. 44

*Mineral Active Carbon From Zirconium Carbonitride*

About 26 grams of zirconium carbonitride was placed in a 15 mm. Vycor tube provided with an external electric heater and chlorine was passed through the tube at a rate of about 5.3 grams per minute while maintaining a temperature of 500–620° C. for about one and a quarter hours; zirconium tetrachloride was initially evolved freely at 125° C. and the temperature was allowed to rise rapidly to 500° C.; reaction was complete at the end of 75 minutes. The product was cooled in chlorine and dechlorinated at 115° C. over the weekend. The resulting mineral active carbon contained 19.6% ash.

The mineral active carbon product adsorbed 0.189 gram of chlorine per gram of product, 0.418 gram of iodine per gram of product, or 0.216 gram of methylene blue per gram of product.

A sample of the mineral active carbon was examined by X-ray diffraction as described for Example 7; there was no trace of any aromatic crystalline pattern.

A sample of the mineral active carbon was tested under vacuum for paramagnetic electron spin resonance, as described for Example No. 11, in its original condition and after heat treatment at temperatures of 250° C., 450° C., 650° C., 900° C., 1050° C.; in no case was any magnetic resonance detectable.

A finely ground sample of the mineral active carbon, when examined under the electron microscope at magnifications of 37,350× and 82,250×, showed a well developed lamellar structure.

EXAMPLE NO. 45

*Mineral Active Carbon From Boron Carbide*

About 8 grams of boron carbide ($B_4C$) were placed in a 15 mm. Vycor tube provided with an external electric heater and chlorine was passed through the tube at a rate of about 5.3 grams per minute while maintaining a temperature of 630–790° C. for two and a half hours; boron trichloride was evolved freely for about one and a half hours, and slowly for a further hour. The product was cooled in chlorine and dechlorinated at 115° C. for about three hours. The resulting mineral active carbon contained 8.1% ash, corresponding to about 98% completion of the reaction if the original carbide were pure.

The mineral active carbon product adsorbed 0.503 gram of chlorine per gram of product, 1.984 gram of iodine per gram of product, or 0.382 gram of methylene blue per gram of product.

A sample of the mineral active carbon was examined by X-ray diffraction as described for Example 7; there was no trace of any aromatic crystalline pattern, but a weak, sharp line due to $B_4C$ impurity was observed near the normal position of the (002) line.

A sample of the mineral active carbon was tested under vacuum for paramagnetic electron spin resonance as described for Example No. 11, in its original condition and after heat treatment at temperatures of 250° C., 750° C., 900° C. and 1050° C.; in no case was any magnetic resonance detectable.

A finely ground sample of the mineral active carbon, when examined under the electron microscope at magnifications of 37,350× and 82,250×, showed a well developed lamellar structure.

EXAMPLE NO. 46

*Mineral Active Carbon From Zirconium Carbide*

About 31 grams of 8/20 mesh zirconium carbide (ZrC) were placed in a 15 mm. Vycor tube provided with an external electric heater and chlorine was passed through the tube at a rate of about 6 grams per minute; the reaction started initially at a temperature of 150° C.; the temperature rose to 500° C. during the first ten minutes and chlorination proceeded in the range 500–800° C. during a further 45 minutes. The product was cooled in chlorine and dechlorinated at 110° C. for two and a half hours. The resulting mineral active carbon contained 22.6% ash, corresponding to about 96.7% completion of the reaction if the original carbide were pure.

A sample of the mineral active carbon was examined by X-ray diffraction as described for Example 7; there was no trace of any aromatic crystalline pattern.

A sample of the mineral active carbon was tested under vacuum for paramagnetic electron spin resonance, as described for Example No. 11, in its original condition and after heat treatment at temperatures of 250° C., 750° C., 900° C. and 1050° C.; in no case was any magnetic resonance detectable.

A finely ground sample of the mineral active carbon, when examined under the electron microscope at magnifications of 37,350× and 82,250×, showed a well developed lamellar structure.

As is well known in the art, and for the various reasons disclosed in the preceding pages, the constitution and properties of an active carbon are the unique resultant of the particular raw material used and of the particular processing method employed. The raw materials employed (metal or metalloid carbides or carbonitrides) and the basic processing method (chlorination to release carbon, followed by dechlorination) are unique raw materials and process in the history of the active carbon art. It is, therefore, apparent that the physical structure of mineral active carbons must be unique and that this structure must impart to the mineral active carbons physical properties which distinguish them from all other forms of carbon previously known to the art. This conclusion is confirmed by the observed properties of mineral active carbons in comparison with the properties of all other forms of carbon known to the art.

Examples 11, 41 43, 44, 45 and 46 show that mineral active carbons prepared from silicon carbide, titanium carbide, zirconium carbide, aluminum carbide, zirconium carbonitride and boron carbide, at temperatures below 900° C., possess no magnetic resonance detectable with a spectrometer which can detect absorption bands up to 100 gauss in width and of intensities as low as $10^{17}$ free spins per gram, using microwaves of 9200 megacycles per second frequency. The detection limit of free spin concentration for a given spectrometer varies with the line width. Our measurements were made on the spectrometer at the University of Buffalo which has a sensitivity as follows: at a line width of 30 gauss a concentration of about $3 \times 10^{19}$ spins per gram can be detected; at 5 gauss width, $2 \times 10^{18}$ spins per gram; and at 0.5 gauss width, about $10^{17}$ spins per gram. Known carbons have resonance absorption band widths of the order of one-half gauss and intensities of the order of $2 \times 10^{20}$ free spins per gram. All carbons which are now known to the art and which are formed below about 900° C. and not subsequently heat treated above the temperature possess measurable magnetic resonance. Mineral active carbons formed below about 900° C., on the other hand, either possess no magnetic resonance at all or their absorption line is at least 100 times weaker and/or 20 to 100 times broader than that of known carbons. Not only do mineral active carbons, as produced, possess no measurable magnetic resonance, but no measurable magnetic resonance is produced in any of them by heat treatments up to 1500° C. This absence of measurable magnetic resonance alone distinguishes mineral active carbons from all forms of carbon known to the art.

All of the so-called "amorphous" forms of carbon known to the art, which have been formed at or heated to temperatures in excess of 400° C., are in fact somewhat crystalline, in that they have sufficiently developed planar aromatic ring structures to show an X-ray diffraction pattern, of which the (002) line, corresponding to the separation of the two dimensional aromatic lattice planes, is the most prominent feature. Examples 41, 44, 45, and 46 show that mineral active carbons formed from titanium, zirconium and boron carbides, and from zirconium carbonitride at maximum temperatures in the range 600–900° C. exhibit no aromatic X-ray diffraction pattern at all. Examples 11 and 43 show that mineral active carbons prepared from silicon carbide and from aluminum carbide at maximum temperatures in this range exhibit only a barely perceptible indication of aromatic planes. Examples 7, 8, and 10 show that mineral active carbons formed from silicon carbide at temperatures up to 1250° C. have barely perceptible or very weak and diffuse (002) lines, indicating that they have a much less well developed aromatic ring structure than do any other carbons known to the art. These structures are estimated to correspond, at the most, to a thickness of 2 to 3 aromatic layers and a diameter of 10 A.U. Only Example 9 formed at 1650° C. shows a crystallite structure at all comparable to known carbons. Because increasing temperature increases the mobility of the atoms, increased development of planar aromatic structures is normal as heat treatment temperature increases. It is truly remarkable that even at 1650° C. the mineral active carbon of Example 9 shows less aromatic structure than does a typical hard carbon at 1400° C. Mineral active carbons have, therefore, very much smaller turbostratic crystallites than carbons heretofore known to the art, when compared at the same heat treatment temperature; and mineral active carbons prepared at or below about 1000° C. have smaller turbostratic crystallites than have even been encountered before in the art, while some have no detectable turbostratic structure at all.

Inasmuch as hard carbons typically have relatively small turbostratic crystallites which grow only relatively slowly at higher temperatures, mineral active carbons might be classed as extremely hard carbons. Soft carbons, on the other hand, have very well developed turbostratic crystallites even at 1100° C., which grow very readily with increasing temperature. In this respect the distinction between mineral active carbons and soft carbons known to the art is very marked. It has already been pointed out that soft carbons, but not hard carbons, show a lamellar structure under the electron microscope and this is in keeping with the limited ability of hard carbons to develop an ordered structure because of the low mobility of their atoms. It is quite remarkable, then, to note that all of the "extremely hard" mineral active carbons exhibit a well developed lamellar structure, as demonstrated by Examples 6, 7, 8, 9, 10, 11, 41, 43, 44, 45 and 46, and as illustrated by FIGURES 6 and 7 which are actual photomicrographs of mineral active carbon prepared from silicon carbide at 825° C. Although lamellar structure under the electron microscope is not a unique property of carbons known to the art, it *is* unique in combination with a minimal turbostratic structure as revealed by X-ray diffraction.

All mineral active carbons made from silicon carbide, as illustrated by Examples 5, 7, 8, 9, 10 and 11, and by FIGURE 5, showed a laminar or laminated structure at 330× magnification under the ordinary microscope. This relatively macroscopic laminar structure must be distinguished from the ultra high magnification lamellar structure although both have their origin in a basic planar structure which is, however, too coarse to diffract X-rays. The low magnification laminar appearance shows that the carbon has a stratified structure, often resulting in deep parallel cracks in the granule. Such features can only be observed when the carbon granule is large enough to have relatively extensive surfaces. Of the other metal carbides employed, only the zirconium carbide grains were large enough to permit observation of this stratification. In Example 46 some laminar structure was observed.

The foregoing properties of mineral active carbons distinguish them from all other forms of carbon, whether surface active or not. They have additional properties which distinguish them from all active carbons previously known to the art. As will be obvious from their inorganic origin, and as is confirmed by Examples 7, 8, 9, 10 and 11, mineral active carbons contain no bound hydrogen, while all known active carbons contain measurable amounts of bound hydrogen, which is a legacy of their organic origin.

The electrical resistivity of known commercial active carbons ranges from 0.08 to 0.7 ohm-cms. Low resistivity is a measure of the extent to which the peripheral side chains and hydrogen have been stripped from the aromatic rings during carbonization, and during activation, of organic carbons. It is not surprising then that mineral active carbons prepared at temperatures in excess of 1000° C. have lower resistivities than are observed for active carbons known to the art, since they contain no side chains or hydrogen at all. Examples 7, 8 and 10 show mineral active carbons prepared above 1000° C. having electrical resistivities about half of the lowest value observed in known active carbons. Example 11 shows that mineral active carbon prepared at 825° C. has about ten times the resistivity of those prepared above 1000° C.; this greater resistiviiy is due, not to the presence of side chains, but to the almost total absence of planar aromatic structures which would help to provide an organized path for the flow of electrons, and in which there are pi-electrons with energies near the conduction band.

Table I summarizes the properties of Examples 7, 8, 9, 10 and 11. The adsorption capacities and heats of wetting of these mineral active carbons for the wide range of adsorbates reported in this table are all comparable to the values obtainable with active carbons known to the art and offered commercially at the present time. Mineral active carbons are therefore demonstrated to be commercially useful for a wide range of gas and vapor phase and of liquid phase adsorption operations. The high heats of wetting relative to active carbons presently in use illustrate their excellent adsorbate retention tenacity. Although the adsorption capacities and heats of wetting of mineral active carbons fall in about the range of values observed for organic active carbons in general, when a number of adsorbates are considered, the pattern of values obtained is found to differ from those of each individual organic active carbon, thereby distinguishing further between mineral active carbons and organic active carbons known to the art. Thus, as compared to known carbons, Example 10 has a high adsorption capacity for organic vapors and a very high heat of wetting by them, whereas it has a relatively low capacity for water although the heat of wetting by water is better than average.

A comparison of Example 10, which was purged, with Example 7, which was prepared at the same temperature but dechlorinated without purging, shows the substantial gain in heat of wetting and in capacity for organic vapors which resulted from the purging operation. The improvement in pH effected by the purging operation is illustrated by Example 11 which had a pH of 2.4 before purging (but after dechlorination) and had a pH of 5.2 after purging. It will be noted that Example 10, after purging, had a pH of 7.1 which is essentially perfect neutrality.

The aforementioned Tables I, II, III and IV are presented below.

Inasmuch as many modifications of the invention will be apparent to those who are skilled in the art, it is the intention that the disclosure be construed broadly, and that it not be limited by the specific embodiments and examples described herein but only by the scope of the appended claims.

TABLE I

*Properties of Mineral Active Carbons*

| Preparation | Example 7 | Example 8 | Example 9 | | Example 10 | Example 11 |
|---|---|---|---|---|---|---|
| Nominal Chlorination temp | 1,050° C. | 1,200° C. | 1,650° C. | | 1,050° C. | 825° C. |
| Atmosphere during cooling | Chlorine | Chlorine | Chlorine | | Nitrogen | Nitrogen |
| Dechlorination method | Static 120° C. | Static 120° C. | Static 110° C. | | Purged in nitrogen | Purged in nitrogen |

| Properties | | | Complete sample | Contained carbon basis | | |
|---|---|---|---|---|---|---|
| Original form: Hydrogen content, percent | 0.00 | 0.00 | 0.00 | | 0.00 | 0.00 |
| 150 mesh form: | | | | | | |
| Ash | 2.5 | 1.9 | 27.3 | | 0.66 | 3.2 |
| Electrical resistivity, ohm-cms | 0.044 | 0.042 | | | 0.035 | 0.51 |
| Vapor capacity, grams/gram for— | | | | | | |
| m-Xylene | 0.377 | 0.380 | | 0.204 | 0.515 | 0.316 |
| Acetone | 0.321 | 0.330 | | 0.183 | 0.493 | 0.320 |
| Benzene | 0.403 | 0.405 | | 0.318 | 0.572 | 0.471 |
| Water (2 hrs.) | 0.169 | 0.159 | | 0.153 | 0.155 | 0.238 |
| Heat of wetting, cals./gram for— | | | | | | |
| m-Xylene | 10.8 | 11.6 | | 4.9 | 17.1 | 11.1 |
| Acetone | 11.1 | 11.6 | | 5.8 | 15.5 | 7.9 |
| Benzene | 10.6 | 11.2 | | 4.9 | 14.0 | 9.7 |
| Water | 6.5 | 3.2 | | 2.2 | 5.8 | 8.9 |
| Gas adsorption capacity, gms./gm. for chlorine | 0.580 | 0.597 | | 0.278 | 0.669 | 0.411 |
| 325 mesh form: | | | | | | |
| Adsorption from solution, gms./gm. for— | | | | | | |
| Iodine | 1.230 | 1.340 | | 0.647 | 1.100 | 1.435 |
| Phenol | 0.344 | 0.368 | | 0.249 | 0.318 | 0.296 |
| Methylene blue | 0.336 | 0.272 | | 0.330 | 0.336 | 0.329 |
| pH | 2.4 | 2.5 | 3.2 | | 7.1 | 5.2 |

TABLE II

*Properties of Mineral Active Carbon Prepared by Wet Dechlorination Methods*

| Ex. No. | Dechlorination method | pH | Volatile at 900° C. | | Volatilized during ashing at 900° C. | | Chloride in ash [1] | Percent ash | Adsorption | |
|---|---|---|---|---|---|---|---|---|---|---|
| | | | Chlorine [1] | Chloride [1] | Chlorine [1] | Chloride [1] | | | Iodine, gms./gm. | m-Xylene, gms./gm. |
| 25 | Water wash | 7.3 | 0.00 | 0.34 | 0.00 | <0.01 | <0.001 | 2.9 | 1.339 | 0.567 |
| 26 | 5% NaOH and water wash | 8.4 | 0.00 | 0.23 | 0.00 | 0.90 | 0.054 | 3.0 | 1.596 | 0.550 |
| 27 | 5% NH₄OH and water wash | 8.1 | 0.00 | 0.98 | 0.00 | 0.14 | 0.000 | 2.0 | 2.230 | 0.546 |
| 28 | 5% NaOH, 5% HCl, and water wash | 7.3 | 0.00 | 0.27 | 0.00 | 0.14 | 0.000 | 2.6 | 1.959 | 0.464 |
| 29 | 5% NH₄OH, 5% HCl, and water wash | 7.3 | 0.00 | 0.68 | 0.00 | 0.31 | <0.001 | [2] 7.1 | 1.992 | 0.555 |
| 30 | 5% NaHSO₃ and water wash | 8.2 | 0.00 | 1.12 | 0.00 | 0.56 | 0.200 | [2] 7.5 | 1.912 | 0.574 |
| 31 | 5% Na₂S₂O₄ and water wash | 2.5 | 0.00 | 1.17 | 0.00 | 0.16 | 0.000 | 2.9 | 1.891 | 0.520 |
| 32 | 5% Na₂S₂O₃ and water wash | 2.4 | 0.00 | 1.29 | 0.00 | 0.09 | <0.001 | 1.5 | 1.839 | 0.478 |
| 33 | 5% H₂O₂ and water wash | 7.3 | 0.00 | 0.85 | 0.00 | 0.66 | 0.000 | 1.8 | 1.946 | 0.412 |
| 34 | 5% Na₂CO₃ and water wash | 7.8 | 0.00 | 1.29 | 0.00 | 0.35 | 0.000 | [2] 7.5 | 1.771 | 0.460 |
| 35 | 5% NaHCO₃ and water wash | 7.7 | 0.00 | 0.84 | 0.00 | 0.45 | 0.000 | 2.5 | 1.710 | 0.537 |
| 36 | 5% HCl and water wash | 7.8 | 0.00 | 1.47 | 0.00 | 0.04 | 0.000 | 2.3 | 1.722 | 0.529 |

[1] As percent of mineral active carbon.  [2] High ash value due to presence of unreacted silicon carbide.

TABLE III

*Vacuum Dechlorination*

[DATA FOR EXAMPLE 24]

| Initial sample | | | Evacuation at 20 mm. Hg | | Chlorine remaining in carbon | | |
|---|---|---|---|---|---|---|---|
| Carbon, grams | Chlorine, grams | Chlorine as gms./gm. carbon | Temp., °C. | Time, hrs. | Grams | Percent of initial | Gms./gm. of carbon |
| 0.1840 | 0.1383 | 0.752 | 0 | 5 | 0.0073 | 5.3 | 0.040 |
| 0.1772 | 0.1374 | 0.775 | 0 | 8 | 0.0044 | 3.2 | 0.025 |
| 0.1816 | 0.1387 | 0.764 | 0 | 15 | 0.0016 | 1.2 | 0.008 |
| 0.1764 | 0.1353 | 0.767 | 0 | 11.5 | 0.0012 | 0.9 | 0.007 |
| 0.1914 | 0.1113 | 0.581 | 25 | 0.5 | 0.0097 | 8.7 | 0.051 |
| 0.1884 | 0.1114 | 0.591 | 25 | 1.5 | 0.0033 | 3.0 | 0.018 |
| 0.1881 | 0.1250 | 0.665 | 25 | 3.0 | 0.0070 | 5.6 | 0.037 |
| 0.1824 | 0.1234 | 0.676 | 25 | 5.6 | 0.0000 | 0.0 | 0.000 |

TABLE IV

*Removal of Chlorides by Heating in Gas Stream*

[DATA OF EXAMPLE 37]

| Treatment | | Chloride analysis | | | Other properties | | | |
|---|---|---|---|---|---|---|---|---|
| Gas stream | Temp., °C. | Example No. | Treatment time, mins. | Percent Cl⁻ | Example No. | Treatment time, mins. | pH | m-Xylene gms./gram |
| Air | 150 | 37A | 130 | 3.34 | 37B | 100 | 2.9 | 0.605 |
| Air | 350 | 37E | 100 | 2.55 | 37F | 110 | 3.7 | 0.632 |
| Nitrogen | 900 | 37E | | 0.97 | | | | |
| Do | 150 | 37C | 80 | 4.15 | 37D | 85 | 2.4 | 0.583 |
| Do | 350 | 37G | 60 | 1.50 | 37H | 60 | 4.6 | 0.613 |
| Do | 900 | 37G | | 0.48 | | | | |

What is claimed is:

1. A process for producing mineral active carbon comprising chlorinating, at an elevated temperature, a material from the group consisting of carbides and carbonitrides of an element from the group consisting of metals and metalloids whose chlorides are volatile at said elevated temperature, volatilizing and removing the resulting chloride from the reaction mass and dechlorinating the residual carbon to obtain a highly adsorbent mineral active carbon containing no bound hydrogen.

2. The process of claim 1 in which the material is silicon carbide.

3. The process of claim 1 in which the material is titanium carbide.

4. The process of claim 1 in which the material is zirconium carbide.

5. The process of claim 1 in which the material is aluminum carbide.

6. The process of claim 1 in which the material is boron carbide.

7. The process of claim 1 in which the material is zirconium carbonitride.

8. The process of claim 1 in which the material is titanium carbonitride.

9. A process for producing mineral active carbon comprising chlorinating, at an elevated temperature, a material from the group consisting of carbides and carbonitrides of an element from the group consisting of metals and metalloids whose chlorides volatilize at said elevated temperature, volatilizing and removing the resulting chloride from the reaction mass and dechlorinating the residual carbon by subjecting the same to heat to obtain a highly adsorbent mineral active carbon containing no bound hydrogen.

10. A process for producing mineral active carbon comprising chlorinating, at an elevated temperature, a material from the group consisting of carbides and carbonitrides of an element from the group consisting of metals and metalloids whose chlorides volatilize at said elevated temperature, volatizing and removing the resulting chloride from the reaction mass and dechlorinating the residual carbon by subjecting the same to vacuum to obtain a highly adsorbent mineral active carbon containing no bound hydrogen.

11. A process for producing mineral active carbon comprising chlorinating, at an elevated temperature, a material from the group consisting of carbides and carbonitrides of an element from the group consisting of metals and metalloids whose chlorides volatilize at said elevated temperature, volatizing and removing the resulting chloride from the reaction mass and dechlorinating the residual carbon by subjecting the same to a stream of gas which does not react with the carbon at the temperature employed.

12. The process of claim 11 in which the gas is air.

13. The process of claim 11 in which the gas is nitrogen.

14. The process of claim 11 in which the gas is steam.

15. The process of claim 11 in which the gas is carbon dioxide.

16. A process for producing mineral active carbon comprising chlorinating, at an elevated temperature, a material from the group consisting of carbides and carbonitrides of an element from the group consisting of metals and metalloids whose chlorides are volatile at said elevated temperature, volatilizing and removing the resulting chloride from the reaction mass and dechlorinating the residual carbon by washing it with water to obtain a highly adsorbent mineral active carbon containing no bound hydrogen.

17. A process for producing mineral active carbon comprising chlorinating, at an elevated temperature, a material from the group consisting of carbides and carbonitrides of an element from the group consisting of metals and metalloids whose chlorides are volatile at said elevated temperature, volatilizing and removing the resulting chloride from the reaction mass and dechlorinating the residual carbon by treating it with a solution of an alkaline material to obtain a highly adsorbent mineral active carbon containing no bound hydrogen.

18. The process of claim 17 in which the alkaline material is an alkali hydroxide.

19. The process of claim 17 in which the alkaline material is an alkali carbonate.

20. The process of claim 17 in which the alkaline material is an alkali bicarbonate.

21. The process of claim 17 in which the alkaline material is ammonia.

22. A process for producing mineral active carbon comprising chlorinating, at an elevated temperature, a material from the group consisting of carbides and carbonitrides of an element from the group consisting of metals and metalloids whose chlorides are volatile at said elevated temperature, volatilizing and removing the resulting chloride from the reaction mass and dechlorinating the residual carbon by treating it with a solution of a reducing agent, to obtain a highly adsorbent mineral active carbon containing on bound hydrogen.

23. The process of claim 22 in which the reducing agent is an alkali bisulfite.

24. The process of claim 22 in which the reducing agent is an alkali hyposulfite.

25. The process of claim 22 in which the reducing agent is an alkali thiosulfate.

26. The process of claim 22 in which the reducing agent is hydrogen peroxide.

27. A process for producing mineral active carbon comprising chlorinating, at an elevated temperature, a material from the group consisting of carbides and carbonitrides of an element from the group consisting of metals and metalloids whose chlorides are volatile at said elevated temperature, volatilizing and removing the resulting chloride from the reaction mass and dechlorinating the residual carbon by treating it with a solution of hydrochloric acid to obtain a highly adsorbent mineral active carbon containing no bound hydrogen.

28. A process for producing mineral active carbon comprising chlorinating, at an elevated temperature, a material from the group consisting of carbides and carbonitrides of an element from the group consisting of metals and metalloids whose chlorides are volatile at said elevated temperature, volatilizing and removing the resulting chloride from the reaction mass, dechlorinating the residual carbon by subjecting the same to heat and then purifying the dechlorinated carbon by heating the carbon to a temperature above 250° C. whereby to remove chlorides and other impurities.

29. The process of claim 28 in which a non-reactive gas stream is employed in the purifying step.

30. A mineral active carbon obtained by the process of claim 1.

31. A mineral active carbon obtained by the process of claim 9.

32. A mineral active carbon obtained by the process of claim 10.

33. A mineral active carbon obtained by the process of claim 11.

34. A mineral active carbon obtained by the process of claim 16.

35. A mineral active carbon obtained by the process of claim 17.

36. A mineral active carbon obtained by the process of claim 22.

37. A mineral active carbon obtained by the process of claim 27.

38. A mineral active carbon obtained by the process of claim 28.

References Cited in the file of this patent

UNITED STATES PATENTS

| | | |
|---|---|---|
| 2,676,873 | Cines et al. | Apr. 27, 1954 |
| 2,681,318 | Mayer | June 15, 1954 |
| 2,739,041 | Andersen | Mar. 20, 1956 |